United States Patent
Laufer

(10) Patent No.: US 9,143,409 B2
(45) Date of Patent: Sep. 22, 2015

(54) CHARACTERIZATION OF THE CAPACITY REGION OF A SET OF TRANSMITTERS IN A COMMUNICATION NETWORK

(71) Applicant: Rafael P. Laufer, Jersey City, NJ (US)

(72) Inventor: Rafael P. Laufer, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 374 days.

(21) Appl. No.: 13/793,790

(22) Filed: Mar. 11, 2013

(65) Prior Publication Data

US 2014/0254403 A1    Sep. 11, 2014

(51) Int. Cl.
H04L 12/24        (2006.01)
H04W 28/04        (2009.01)

(52) U.S. Cl.
CPC .............. *H04L 41/145* (2013.01); *H04L 41/12* (2013.01); *H04L 41/14* (2013.01); *H04L 41/142* (2013.01); *H04W 28/044* (2013.01)

(58) Field of Classification Search
CPC ..... H04L 41/145; H04L 41/142; H04L 41/14; H04L 41/12; H04W 52/34
See application file for complete search history.

(56) References Cited

U.S. PATENT DOCUMENTS

| | | | | |
|---|---|---|---|---|
| 7,336,930 | B2 * | 2/2008 | Larsson et al. | 455/63.1 |
| 8,593,953 | B2 * | 11/2013 | Marbach et al. | 370/230 |
| 2003/0212798 | A1 * | 11/2003 | Furuskar et al. | 709/227 |
| 2007/0147248 | A1 * | 6/2007 | Kodialam et al. | 370/235 |
| 2008/0070585 | A1 * | 3/2008 | Wu et al. | 455/452.2 |
| 2008/0188256 | A1 * | 8/2008 | Wu et al. | 455/522 |
| 2012/0170457 | A1 * | 7/2012 | Zdarsky et al. | 370/232 |
| 2014/0185596 | A1 * | 7/2014 | Han et al. | 370/337 |

OTHER PUBLICATIONS

Kleinrock et al., "Packet Switching in Radio Channels: Part I—Carrier Sense Multiple-Access Modes and their Throughput-Delay Characteristics," *IEEE Trans. on Communications*, vol. COM-23, No. 12, pp. 1400-1416, Dec. 1975.

Campista et al., "A Routing Protocol Suitable for Backhaul Access in Wireless Mesh Networks," *Computer Networks*, vol. 56, No. 2, pp. 703-718, Feb. 2012.

R. Boorstyn et al., "Throughput Analysis in Multihop CSMA Packet Radio Networks", *IEEE Trans. on Communications*, vol. 35, No. 3, pp. 267-274, Mar. 1987.

M. Garetto et al., "Modeling Per-Flow Throughput and Capturing Starvation in CSMA Multi-Hop Wireless Networks," *IEEE Trans. on Networking*, vol. 16, No. 4, pp. 864-877, Aug. 2008.

(Continued)

*Primary Examiner* — Omer S Mian
(74) *Attorney, Agent, or Firm* — Wall & Tong, LLP

(57) ABSTRACT

A capability is provided for characterizing the capacity region of a set of transmitters of a communication network. A set of interference constraints is determined for a set of transmitters having a plurality of transmitters. A plurality of expressions for a respective plurality of transmission time fractions for the transmitters are determined, as functions of a plurality of stability parameters of the respective transmitters and a plurality of ratio parameters of the respective transmitters, based on the set of interference constraints. A plurality of expressions for the respective plurality of stability parameters for the transmitters are determined as functions of the transmission time fractions of the transmitters and the ratio parameters of the transmitters. The expressions for the stability parameters are indicative of the capacity region of the set of transmitters, which may be determined by evaluating the expressions for the stability parameters.

9 Claims, 8 Drawing Sheets

(56) References Cited

OTHER PUBLICATIONS

B. Nardelli et al., "Closed-form Throughput Expressions for CSMA Networks with Collisions and Hidden Terminals," in *Proc. IEEE INFOCOM*, Mar. 2012.

S. Liew et al., "Back-of-the-Envelope Computation of Throughput Distributions in CSMA Wireless Networks," *IEEE Trans. on Mobile Computing*, vol. 9, No. 9, Sep. 2010.

X. Wang et al., "Throughput Modeling and Fairness Issues in CSMA/CA Based Ad-Hoc Networks," in *Proc. IEEE INFOCOM*, Mar. 2005.

Y. Gao et al., "Determining the End-to-End Throughput Capacity in Multi-hop Networks: Methodology and Applications," in *Proc. ACM SIGMetrics*, Saint Malo, France, Jun. 26-30, 2006.

M. Durvy et al., "Self-Organization Properties of CSMA/CA Systems and Their Consequences on Fairness," *IEEE Trans. on Information Theory*, vol. 55, No. 3, pp. 931-943, Mar. 2009.

P.C. Ng et al., "Throughput Analysis of IEEE802.11 Multi-Hop and Ad Hoc Networks," *IEEE Trans. on Networking*, vol. 15, No. 2, pp. 309-322, Apr. 2007.

M. M. Carvalho et al., "A Scalable Model for Channel Access Protocols in Multihop Ad Hoc Networks," in *Proc. ACM MobiCom*, pp. 330-344, Sep. 2004.

L. Jiang et al., "Removing Hidden Nodes in IEEE 802.11 Wireless Networks," in *Proc. IEEE VTC*, pp. 1127-1131, Sep. 2005.

H. Zhai et al., "How Well can the IEEE 802.11 Wireless LAN Support Quality of Service?" *IEEE Trans. on Wireless Communications*, vol. 4, No. 6, pp. 3084-3094, Nov. 2005.

K. Medepalli et al., "Towards Performance Modeling of IEEE 802.11 based Wireless Networks: A Unified Framework and its Applications," in *Proc. IEEE INFOCOM*, Apr. 2006.

A. Jindal et al., "The Achievable Rate Region of 802.11-Scheduled Multihop Networks," *IEEE Trans. on Networking*, vol. 17, No. 4, pp. 1118-1131, Aug. 2009.

R. Laufer, "Routing Paradigms for Wireless Multihop Networks—a dissertation submitted in partial satisfaction of the requirements for the degree Doctor of Philosophy in Computer Science," University of California, Los Angeles, Nov. 2011.

R. Laufer, "Routing Paradigms for Wireless Multihop Networks," Computer Science Department, University of California at Los Angeles, Nov. 2011.

\* cited by examiner

CHARACTERIZATION OF THE CAPACITY REGION OF A SET OF TRANSMITTERS IN A COMMUNICATION NETWORK

TECHNICAL FIELD

The disclosure relates generally to communication networks and, more specifically but not exclusively, to the characterization of the capacity region of a set of transmitters in a communication network.

BACKGROUND

Carrier sense multiple access (CSMA) is a media access control (MAC) protocol in which a node verifies the absence of other traffic before transmitting on a shared transmission medium, such as an electrical bus or a band of electromagnetic spectrum. The term "carrier sense" indicates that a transmitter uses feedback from a receiver that detects a carrier wave before trying to transmit (e.g., attempting to detect the presence of an encoded signal from another station before attempting to transmit) such that when a carrier is sensed the transmitter may wait for completion of the transmission that is currently in progress before initiating a new transmission. The term "multiple access" indicates that multiple terminals send and receive traffic via the transmission medium. CSMA collision avoidance (CSMA/CA) is used to improve the performance of CSMA by attempting to be less greedy with the transmission medium by deferring transmission for a random interval if another ongoing transmission is sensed on the medium.

In general, multi-hop wireless networks have been considered a difficult modeling problem, because transmissions from a given node may affect the medium access of one or more other nodes in an intricate way. For example, in a CSMA/CA wireless network, a non-transmitting node that detects an ongoing transmission by a transmitting node is expected to remain silent at least until the transmitting node has finished the transmission. While this silence of the non-transmitting node may prevent a collision that is caused by the non-transmitting node, the silence by the non-transmitting node may also be interpreted by neighboring nodes of the non-transmitting node as an indication that the medium is idle and, thus, may trigger new transmissions by one or more of the neighboring nodes.

SUMMARY OF EMBODIMENTS

Various deficiencies in the prior art may be addressed by embodiments for supporting characterization of the capacity region of a wireless network.

In one embodiment, an apparatus includes a processor and a memory communicatively connected to the processor. The processor is configured to determine a set of interference constraints for a set of transmitters including a plurality of transmitters. The processor is configured to determine, based on the set of interference constraints, a plurality of expressions for a respective plurality of fractions of time that the transmitters transmit. The processor is configured to determine, based on the expressions for the fractions of time that the transmitters transmit, a plurality of expressions for a respective plurality of stability parameters of the transmitters, where the expressions for the stability parameters are indicative of a capacity region of the set of transmitters.

In one embodiment, a method includes using a processor and a memory to perform a set of steps. The method includes determining a set of interference constraints for a set of transmitters including a plurality of transmitters. The method includes determining, based on the set of interference constraints, a plurality of expressions for a respective plurality of fractions of time that the transmitters transmit. The method includes determining, based on the expressions for the fractions of time that the transmitters transmit, a plurality of expressions for a respective plurality of stability parameters of the transmitters, where the expressions for the stability parameters are indicative of a capacity region of the set of transmitters.

In one embodiment, an apparatus includes a processor and a memory communicatively connected to the processor. The processor is configured to determine a set of transmission conditions for a set of transmitters, where the set of transmitters includes a plurality of transmitters. The processor is configured to determine a capacity region of the set of transmitters, where the capacity region is defined based on a plurality of expressions of a respective plurality of stability parameters of the transmitters. The processor is configured to obtain transmitter input information of the transmitters in the set of transmitters. The processor is configured to determine feasibility of the set of transmission conditions based on the expressions of the stability parameters and the transmitter input information.

In one embodiment, a method includes using a processor and a memory to perform a set of steps. The method includes determining a set of transmission conditions for a set of transmitters, where the set of transmitters includes a plurality of transmitters. The method includes determining a capacity region of the set of transmitters, where the capacity region is defined based on a plurality of expressions of a respective plurality of stability parameters of the transmitters. The method includes obtaining transmitter input information of the transmitters in the set of transmitters. The method includes determining feasibility of the set of transmission conditions based on the expressions of the stability parameters and the transmitter input information.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

In general, a capability is provided for characterizing the capacity region of at least a portion of a communication network (e.g., a set of transmitters of the communication network, which may include all or a subset of the transmitters in the communication network).

In at least some embodiments, the capacity region characterization capability is configured to enable determination of expressions which characterize, or are adapted for use in characterizing, the capacity region of at least a portion of a communication network.

In at least some embodiments, the capacity region characterization capability is configured to enable application of expressions which characterize, or are adapted for use in characterizing, the capacity region of at least a portion of a communication network.

In at least some embodiments, the capacity region characterization capability is configured to enable application of expressions which characterize, or are adapted for use in characterizing, the capacity region of at least a portion of a multi-hop communication network. It will be appreciated that a multi-hop network may support single-hop flows or multi-hop flows.

In at least some embodiments, the capacity region characterization capability fully characterizes and predicts the behavior of a multi-hop communication network even when there is a strong interdependence among the states of the transmitters across the multi-hop communication network.

It will be appreciated that, although primarily depicted and described herein within the context of application of embodiments of the capacity region characterization capability to a particular type of communication network (namely, a wireless communication network employing a carrier sense multiple access with collision avoidance (CSMA/CA protocol), embodiments of the capacity region characterization capability may be applied to various other types of wireless or wired communication systems using shared transmission mediums (e.g., a shared electrical bus, a shared band of electromagnetic spectrum, or the like).

Figure 1:
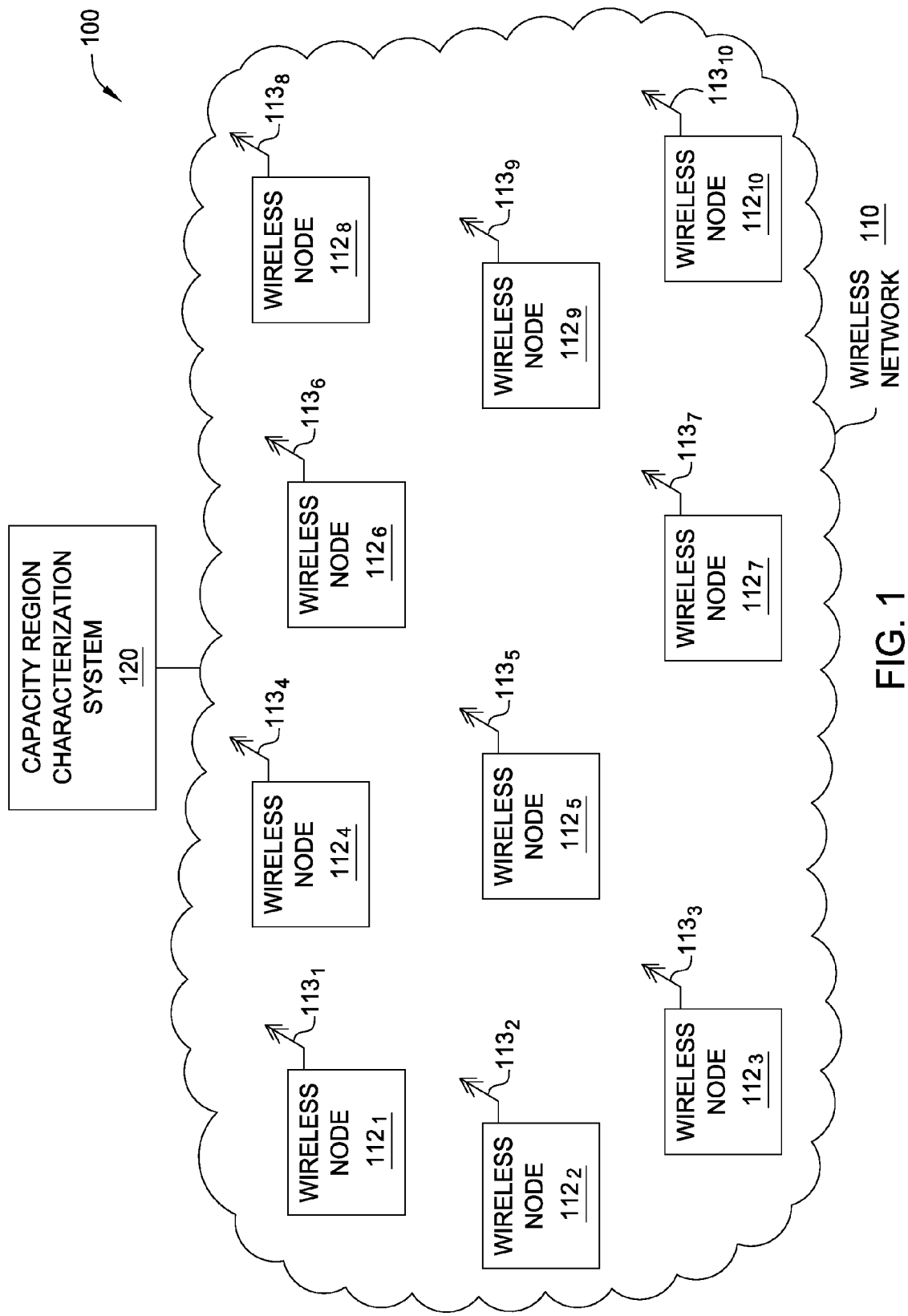
FIG. 1 depicts a high-level block diagram of an exemplary wireless system.

FIG. 1 depicts a high-level block diagram of an exemplary wireless system.

As depicted in FIG. 1, the wireless system 100 includes a wireless network 110 having ten wireless nodes $112_1$-$112_{10}$ (collectively, wireless nodes 112). In general, each of the wireless nodes 112 is configured to communicate wirelessly with one or more other wireless nodes 112 and, thus, each wireless node 112 includes at least one wireless transmitter and at least one wireless receiver. Illustratively, the wireless nodes $112_1$-$112_{10}$ include ten wireless transceivers $113_1$-$113_{10}$ (collectively, wireless transceivers 113), respectively. The wireless nodes 112 of wireless network 110 are running the CSMA/CA protocol. For example, wireless node $112_1$ may communicate with wireless nodes $112_2$, $112_3$, $112_4$, and $112_5$ due to its geographic proximity to these wireless nodes 112, but not the other wireless nodes 112 of wireless network 110 which may be out of wireless range of wireless node $112_1$. Similarly, for example, wireless node $112_{19}$ may communicate with wireless nodes $112_7$ and $112_9$ due to its geographic proximity to these wireless nodes 112, but not the other wireless nodes 112 of wireless network 110 which may be out of wireless range of wireless node $112_{19}$. It will be appreciated that, for a given wireless node 112, the number of other wireless nodes 112 with which that given wireless node 112 communicates may depend on the geographic distances between the wireless nodes 112, the transmit powers of the wireless transmitters of the wireless nodes, the fading of the wireless signal during its propagation from the wireless transmitters to the wireless receivers, the noise at the wireless receivers of the wireless nodes, and the like, as well as various combinations thereof.

As further depicted in FIG. 1, wireless system 100 includes a capacity region characterization system 120. The capacity region characterization system 120 may be configured to provide various functions of the capacity region characterization capability. The capacity region characterization system 120 may be configured to characterize the capacity region of at least a portion of wireless network 110. The capacity region characterization system 120 may be configured to determine expressions adapted for use in characterizing the capacity region of at least a portion of the wireless network 110. The capacity region characterization system 120 may be configured to determine the capacity region of at least a portion of the wireless network 110 by applying expressions adapted for use in characterizing the capacity region of at least a portion of the wireless network 110. The capacity region characterization system 120 may be configured to provide various other functions of the capacity region characterization capability. The capacity region characterization system 120 may be communicatively connected to the wireless network 110 (as depicted in FIG. 1) or otherwise associated with the wireless network 110 (e.g., where the capacity region characterization system 120 may store information associated with wireless network 110).

The wireless network 110 may be configured to support single hop flows or multi-hop flows. It has been determined that there are difficulties associated which characterizing and predicting the behavior of wireless networks supporting multi-hop flows or even single hop flows, e.g., since there may be a strong interdependence among the states of the transmitters across the network. It also has been determined that at least part of the difficulty in characterizing and predicting the behavior of a multi-hop wireless network is due to the following factors: (1) the distributed nature of the CSMA/CA MAC protocol, which dictates that transmitters should back off from each other in order to avoid collisions, (2) the buffer dynamics of unsaturated traffic transmitters, which occasionally cause queues to become empty and result in a time-varying subset of transmitters contending for the channel, and (3) the dependence of downstream hops on upstream traffic, which couples together the queue occupancy of all hops in a multi-hop flow. The first factor induces some correlation among neighboring transmitters, because of the physical proximity of the neighboring transmitters. The second and third factors, on the other hand, correlate transmitters throughout the network, at least because of the traffic pattern. These factors or problems are further exacerbated if the multi-hop wireless network serves several flows at the same time and, therefore, transmissions of a given flow affect the medium access, as well as the throughput, of other flows. Accordingly, in at least some embodiments, a throughput model for a wireless network may be expected to account for the physical proximity of wireless transmitters and the respective interference constraints of the wireless transmitters, as well as the end-to-end traffic requirements of the flows of the multi-hop wireless network.

Various embodiments of the capacity region characterization capability may be better understood by considering an exemplary system model and associated assumptions. It will be appreciated that the exemplary system model and associated assumptions may be related to wireless network 110 of FIG. 1 or any other suitable type of communication network for which the capacity region characterization capability may be applied.

In an exemplary system model, a wireless network includes nodes that forward traffic to each other in a multi-hop fashion based on various characteristics, descriptions of which follow. End-to-end routes are established according to a given routing metric before the network becomes operational, and are assumed to remain fixed over time (although it will be appreciated that, in at least some cases, they may change over time). Each multi-hop flow is then allowed to traverse the network using these end-to-end routes. The flows, and the respective average rates of the flows, do not change, at least for a sufficient amount of time, to allow for convergence to a steady state. For ease of presentation, it is assumed that each node is equipped with an omni-directional antenna communicating in a single channel, although it will be appreciated that various embodiments presented herein may be extended to directional antennas or multi-channel wireless networks. It is assumed that each node includes a unique transmission flow queue for each flow, although it will be appreciated that various embodiments presented herein may be extended to other queuing schemes (e.g., use of a single transmission queue shared by all flows, use of multiple transmission queues dedicated for use by respective groups of flows, or the like). When a packet of a flow arrives at a node, the packet is placed in the corresponding transmission flow queue associated with the flow for future transmission. Packet scheduling across transmission flow queues within a node may be performed using a CSMA/CA MAC protocol (assumed to be an idealized CSMA/CA MAC protocol). The transmission flow queues of a node may operate as logically individual nodes (e.g., as individual, collocated transmitters having their own sets of parameters associated therewith, respectively).

In the exemplary system model, as discussed above, the wireless network includes nodes where each node may include one or more associated transmitters. It is assumed that the CSMA/CA MAC protocol controls the medium access among the transmitters of the nodes. In CSMA/CA, before transmitting a packet, a node having a transmitter i first uses carrier sensing to determine whether the medium is idle. If the received power detected during carrier sensing is above a given threshold then the medium is considered to be busy and the transmitter i of the node waits until the ongoing transmission is finished; otherwise, the medium is considered idle and the transmitter i of the node independently samples a random back-off interval $B_i$ from a given probability distribution (which can be the same or different for different transmitters) and waits for at least that length of time before transmitting. It is noted that, while the back-off interval may be exponentially distributed, this is not required; in fact, no assumptions are placed on the probability distribution of the back-off intervals. It is assumed that each transmission flow queue within a node is a transmitter i having an associated back-off counter which tracks the remaining time until the next scheduled transmission by the transmitter i (e.g., counting down to zero). If the medium becomes busy during the back-off interval of a transmitter i, then the transmitter i freezes its counter and resumes the countdown when the medium becomes idle again. The transmitter i transmits when its counter reaches zero.

The duration of a packet transmission may be modeled as follows. Each transmission from transmitter i takes a random time $T_i$, which depends both on the packet size of the packet being transmitted and on the bit rate at which the packet is transmitted. The bit rate $r_i$ of each transmitter i is assumed to be fixed (although it will be appreciated that, in at least some embodiments, the bit rates may change over time) and, thus, the randomness of $T_i$ comes from the different packet sizes generated by the flow source i associated with the transmitter i. It is noted that, while exponentially distributed packet sizes or independent regeneration of packets at relay nodes may be used during transmission of packets, neither is required. Rather, for purposes of clarity, it is assumed that packet sizes are generated by the flow source i according to a given discrete probability distribution (which may be the same or different across flows), and that packets retain their sizes as the packets traverse the network. In addition, it is noted that, while saturation of all transmitters i is possible, an assumption is not made that all transmitters are saturated; rather, it is assumed that all packets are generated at each flow source i with a random inter-arrival time $A_i$, following a given probability distribution, which may be the same or different across flows. As before, no assumptions are placed on these probability distributions.

The transmission of a packet may be susceptible to errors. It is assumed that packets are received without interference and, thus, that fading and the random noise in the wireless channel are the only sources of error. This implies two important assumptions on the network model as follows. The first assumption is that there are no hidden nodes in the network and, thus, that if two transmitters interfere at a common receiver then each transmitter is able to sense the transmission of the other transmitter and back off accordingly. This first assumption is proven to occur if the carrier-sense range is large enough and if receivers can abort an ongoing reception to lock onto a new signal with a sufficiently higher power. There are at least some chipsets that support this type of preemption in the so-called restart mode and, thus, the hidden node problem can be avoided. The second assumption is that the carrier sensing is instantaneous and, thus, that as soon as a transmission starts the transmission is immediately detected by the neighbor nodes. This second assumption implies that both the propagation delay and the carrier-sense delay are zero (or substantially near zero). This implication of the second assumption is reasonable since the nodes are usually physically close to each other and carrier sensing takes only a few microseconds in at least some of the existing wireless cards. Additionally, with instantaneous carrier sensing, collisions due to two or more transmitters finishing their associated back-off intervals at the same time are also not possible since these intervals are continuous random variables.

In view of the foregoing assumptions, each packet is received by the transceiver associated with transmitter i (namely, with the receiver portion of the transceiver) with a given probability $p_i$ (the packet delivery ratio of transmitter i) at the chosen bit rate $r_i$. If the transmission fails, the transmitter i samples another back-off interval and rebroadcasts the packet as many times as necessary. This model has shown to accurately approximate the behavior of transmitters. However, even if hidden interferers and collisions do exist in the network, the effect of such conditions is considerably reduced in the unsaturated conditions considered in this exemplary system model. In any case, if hidden interference and collisions occur often in the network, then the capacity limits described in this disclosure present in fact an upper bound of the actual network capacity limits (e.g., the actual network capacity limits may be lower than the limits computed herein).

In CSMA/CA networks, several transmitters may transmit together if the transmitters are unable to sense the transmissions of the other transmitters. A set of transmitters able to simultaneously transmit is defined as a feasible set (which is denoted herein using S or K). It is assumed that all feasible sets of transmitters of the network are known. Given this knowledge of the feasible transmitter sets, the network state is defined as the feasible set S of transmitters which are currently transmitting. $\pi_S$ is defined as the probability, or the fraction of time, that the network is in state S (i.e., transmitters in S are simultaneously transmitting) and, thus, $\Sigma_S \pi_S = 1$. $\pi_\varnothing$ is used to represent the fraction of time that no transmitter is transmitting across the entire network (i.e., S=Ø). With a slight manipulation of notation, the probability $\pi_{\{i,j\}}$ that two transmitters i and j are both transmitting is expressed as $\pi_{i,j}$. Finally, $\theta_i = E[T_i]/E[B_i]$ is defined as the ratio between the expected transmission time $E[T_i]$ and the expected back-off time $E[B_i]$ for transmitter i, and $x_f$ is defined as the average throughput of a flow $f$ in bits per second. The notations of the exemplary system are summarized in Table 1.

TABLE 1

| Notation | Definition |
| --- | --- |
| $A_i$ | random variable for the inter-arrival time at transmitter i |
| $B_i$ | random variable for the back-off interval of transmitter i |
| $T_i$ | random variable for the transmission time of transmitter i |
| $\theta_i$ | ratio between $E[T_i]$ and $E[B_i]$, i.e., $\theta_i = E[T_i]/E[B_i]$ |
| $r_i$ | bit rate of transmitter i, in bits per second (assumed fixed) |
| $p_i$ | packet delivery ratio of transmitter i (assumed fixed) |
| $x_f$ | average throughput of a flow f, in bits per second |
| S or K | a set of transmitters which may transmit at the same time |
| $\pi_S$ | probability that all transmitters in S are transmitting |
| $\pi_\varnothing$ | probability that no transmitter is transmitting (S = Ø) |
| $\pi_{i,j}$ | probability that two transmitters (i and j) are both transmitting |
| $\rho_i$ | stability parameter of transmitter i |
| $\gamma_i$ | product of $\rho_i$ and $\theta_i$, i.e., $\gamma_i = \rho_i \theta_i$ |
| $y_i$ | fraction of time that transmitter i is transmitting, i.e., $y_i = \sum_{S: i \in S} \pi_S$ |

In at least some embodiments, for a given CSMA/CA network, the throughput of each flow of the CSMA/CA network may be determined and the capacity region of the CSMA/CA network may be determined. In at least some embodiments, the throughput of saturated single-hop flows may be determined. In at least some embodiments, the throughput of unsaturated single-hop flows may be determined. In at least some embodiments, the embodiments related to single-hop flows in a CSMA/CA network may be generalized to address multi-hop flows in an arbitrary multi-hop wireless network.

In at least some embodiments, the throughput of saturated single-hop flows in a CSMA/CA network may be determined. It is assumed that each node of the network communicates only with direct neighbor nodes and, thus, that each flow of the network is transmitted only over a single hop. This type of model may apply, for example, to an enterprise wireless local area network (WLAN) in which several access points are deployed across an enterprise campus. It is further assumed that the network includes n transmitters (which are able to sense each other via carrier sensing) where each of the n transmitters is saturated with an infinite backlog of packets to transmit. In these conditions, when a given transmitter is transmitting, the back-off counters of the other transmitters are frozen until the current transmission is complete. This scenario results in unfinished work associated with each of the transmitters. An example of unfinished work for a set of saturated transmitters is illustrated in FIG. 2.

Figure 2:
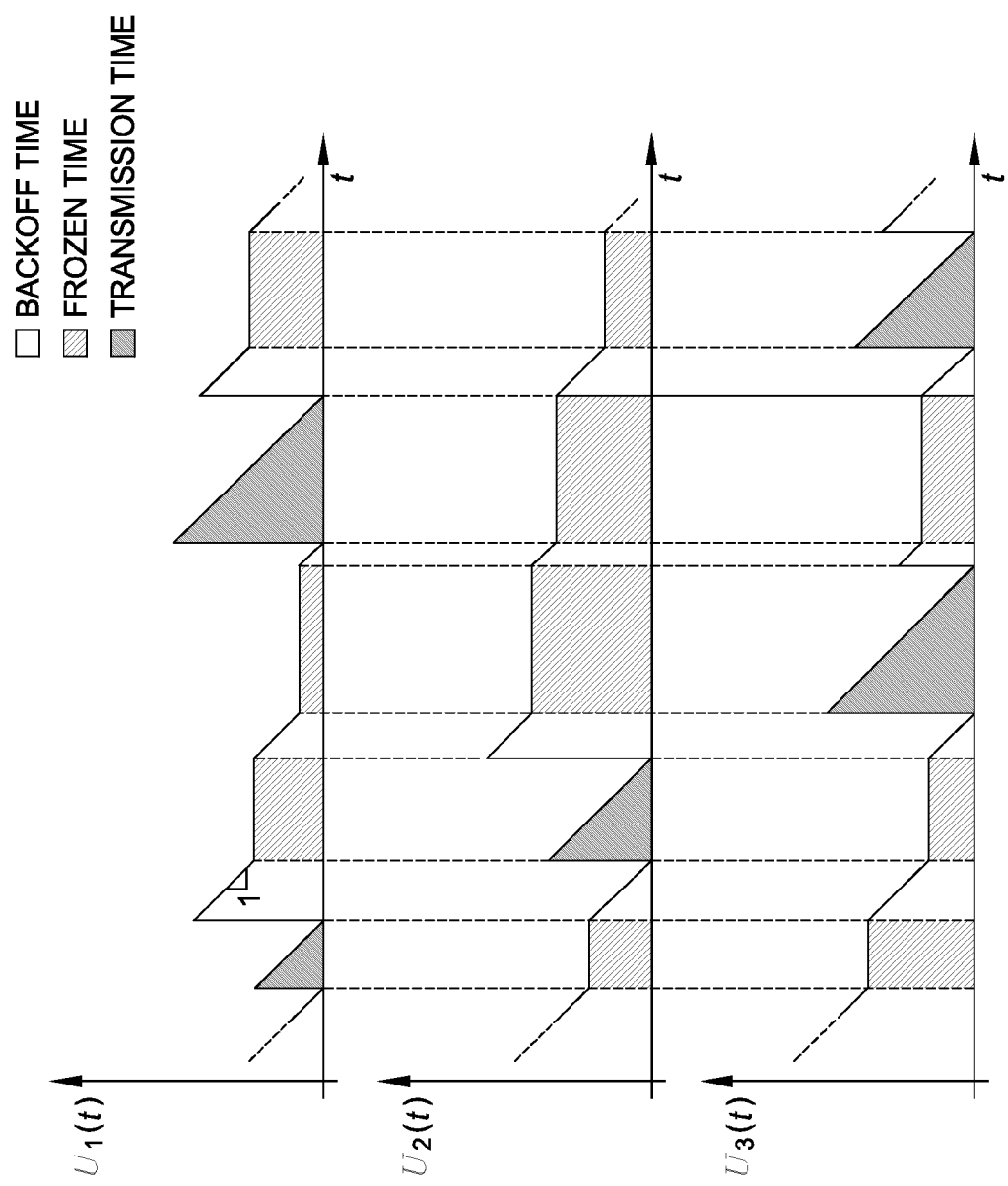
FIG. 2 depicts the operation of three saturated transmitters associated with three nodes of a network where the three saturated transmitters are within carrier sense range.

FIG. 2 depicts the operation of three saturated transmitters associated with three nodes of a network where the three saturated transmitter are within carrier sense range.

As depicted in FIG. 2, the unfinished work $U_i(t)$ of each transmitter i at time t is illustrated. More specifically, FIG. 2 depicts the unfinished work $U_1(t)$ for a first transmitter, the unfinished work $U_2(t)$ for a second transmitter, and the unfinished work $U_3(t)$ for a third transmitter. As further depicted in FIG. 2, at any time t, each transmitter may be in one of three states: a back-off state, a frozen state, or a transmission state (which are depicted in FIG. 2 using different types of shading). The unfinished work $U_i(t)$ of a transmitter i represents the remaining time before the state of transmitter i changes and may express either the remaining back-off time of transmitter i or the remaining transmission time of transmitter I.

In general, it is known from the saturation condition that a transmitter i will be either backing off, frozen, or transmitting. For each packet, a back-off interval $B_i$ is sampled, and transmitter i waits at least the length of the sampled back-off interval before transmitting. If a neighbor of transmitter i begins transmitting during the back-off interval, the back-off counter of transmitter i is frozen and transmitter i waits for the ongoing transmission to finish. When the transmission of the neighbor is finished, transmitter i restarts the countdown of the back-off counter from where it had previously stopped and waits for the back-off counter to expire. When the back-off counter of transmitter i expires, transmitter i transmits the packet for $T_i$ seconds, after which the cycle restarts. It will be appreciated that there are n+1 states in which such a network can operate. The first state (denoted as S=Ø) occurs when none of the transmitters are transmitting. The other n states S={i} occur when transmitter i is active while the other transmitters are frozen. The steady-state solution then defines the probabilities $\pi_0, \pi_1 \ldots, \pi_n$ of each of the n+1 network states.

Let $c_i(t)$ be the transmission count from transmitter i in a large time window [0,t). If, within this time window, transmitter i made $c_i(t)$ transmissions, then transmitter i also has backed off $c_i(t)$ times since there is a back-off interval for each packet that is transmitted. Given that each transmitter only decreases its back-off counter when no other transmitter is transmitting (when the network state is S=0), the ratio $\pi_i/\pi_\varnothing$ may be computed as:

$$\frac{\pi_i}{\pi_\varnothing} = \lim_{t \to \infty} \frac{\frac{1}{t}\sum_{j=1}^{c_i(t)} T_i(j)}{\frac{1}{t}\sum_{j=1}^{c_i(t)} B_i(j)} = \lim_{t \to \infty} \frac{\frac{1}{c_i(t)}\sum_{j=1}^{c_i(t)} T_i(j)}{\frac{1}{c_i(t)}\sum_{j=1}^{c_i(t)} B_i(j)} = \frac{E[T_i]}{E[B_i]} = \theta_i, \quad (1)$$

where $B_i(j)$ and $T_i(j)$ are the duration of the j-th back-off interval and the j-th transmission of transmitter i, respectively. It will be appreciated that $\pi_i/\pi_\varnothing$ does not depend on the individual distributions of $T_i$ and $B_i$, but rather, only depends on the ratio $\theta_i$ between the expected values of $T_i$ and $B_i$. From Eq. (1), a system of linear equations can be written as:

$$\pi_\varnothing = \frac{\pi_1}{\theta_1} = \frac{\pi_2}{\theta_2} = \ldots = \frac{\pi_n}{\theta_n} \quad (2)$$

which, along with the normalizing condition $\Sigma_S \pi_S = 1$, may be solved to find the steady-state probabilities as follows:

$$\pi_\varnothing = \frac{1}{1 + \theta_1 + \theta_2 + \ldots + \theta_n} \quad (3)$$

$$\pi_i = \frac{1}{1 + \theta_1 + \theta_2 \ldots + \theta_n}.$$

The average throughput $x_i$ of transmitter i may then be computed as $$x_i = \left(\frac{\theta_i}{1 + \theta_1 + \theta_2 + \ldots + \theta_n}\right) r_i p_i. \quad (4)$$

In a more general case, assume that there are still n transmitters in the network, but that not all of the transmitters are within carrier-sense range. As a result, two or more transmitters that do not hear each other may transmit at the same time. The steady-state probabilities for this general case may be computed by establishing the relationship between two general states $\pi_S$ and $\pi_{S \cup \{i\}}$, which differ only by a single transmitter i. A saturated CSMA/CA network has been proven to be a time-reversible Markov field and, thus, detailed balance holds. In this case, the relation between any two adjacent network states, S and $S \cup \{i\}$, is shown to be $$\pi_S = \frac{\pi_{S \cup \{i\}}}{\theta_i}. \quad (5)$$

It is noted that Eq. (5) generalizes the relation in Eq. (2) for the case where transmitters are not necessarily within carrier-sense range. From Eq. (5), a system of linear equations can then be written as:

$$\pi_\emptyset = \frac{\pi_1}{\theta_1} = \ldots = \frac{\pi_n}{\theta_n} = \ldots = \frac{\pi_{i,j}}{\theta_i \theta_j} = \ldots = \frac{\pi_S}{\prod_{k \in S} \theta_k}, \quad (6)$$

which, along with the normalizing condition $\Sigma_S \pi_S = 1$, may be solved to find the steady-state probabilities $$\pi_\emptyset = \frac{1}{\sum_K \prod_{k \in K} \theta_k} \quad (7)$$

$$\pi_S = \frac{\prod_{k \in S} \theta_k}{\sum_K \prod_{k \in K} \theta_k},$$

where the summation in the denominator is over all feasible sets K. The fraction of time a given set S transmits is thus proportional to the product of the $\theta_k$ ratios of each transmitter k within this set. From Eq. (7), the average throughput $x_i$ of transmitter i can then be computed as $x_i = (\Sigma_{S:i \in S} \pi_S) r_i p_i$, where the summation is over all sets S where transmitter i is transmitting.

The foregoing discussion regarding saturated single-hop flows may be generalized for the case of unsaturated single-hop flows. This reflects the case where nodes communicate only with direct neighbors, but now each transmitter does not always have a packet to transmit. As a result, the subset of transmitters contending for the channel significantly changes over time, imposing an extra challenge to the model.

Let the network have n transmitter able to carrier sense each other. Each transmitter i generates packets with a random inter-arrival time $A_i$, following a given probability distribution, and the packets are then placed into the respective flow queue for transmission. An example of unfinished work for a set of unsaturated transmitters is illustrated in FIG. 3.

Figure 3:
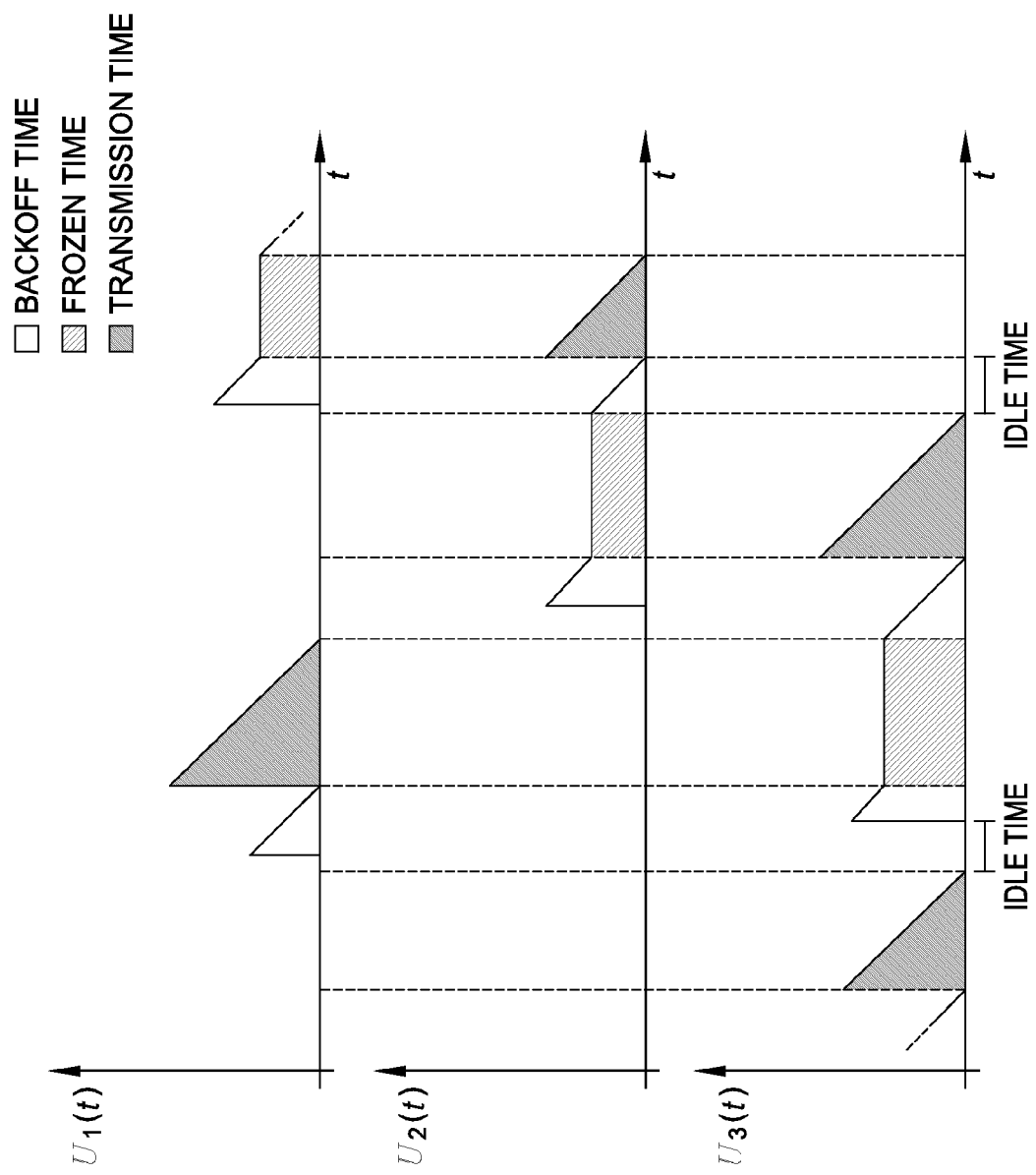
FIG. 3 depicts the operation of three unsaturated transmitters associated with three nodes of a network where the three unsaturated transmitters are within carrier sense range.

FIG. 3 depicts the operation of three unsaturated transmitters associated with three nodes of a network where the three unsaturated transmitters are within carrier sense range.

As depicted in FIG. 3, the unfinished work $U_i(t)$ of each transmitter i at time t is illustrated. More specifically, FIG. 3 depicts the unfinished work $U_1(t)$ for a first transmitter, the unfinished work $U_2(t)$ for a second transmitter, and the unfinished work $U_3(t)$ for a third transmitter. As further depicted in FIG. 3, at any time t, each transmitter may be in one of four states, which include three active states (e.g., a back-off state, a frozen state, a transmission state) and an idle state. The active states are depicted using lines defining areas and using different types of shading within the areas defined by the lines. The idle state is depicted as white space not enclosed by any type of lines.

As depicted in FIG. 3, the queue backlogs of the transmitters are no longer infinite and, thus, each transmitter i has a packet to send only part of the time. A transmitter i is active when the queue of the transmitter is non-empty, but remains idle otherwise. When a new packet arrives at an empty queue associated with a transmitter i, the back-off counter $B_i$ is sampled and the countdown of the back-off counter for transmitter i begins. The behavior is then similar to that of a saturated network (e.g., such as the behavior depicted in FIG. 2, where each transmitter i freezes its back-off counter whenever a neighbor transmitter transmits, and where the transmitter i transmits for $T_i$ seconds after the back-off counter of the transmitter i is decremented to zero). The time during which a transmitter i could be counting down via its back-off timer, but is not counting down via its back-off timer because the associated queue is empty, is referred to as the idle time of the transmitter I. It is noted that, given that the three transmitters in FIG. 3 are within carrier-sense range, the countdown by the third transmitter only occurs when none of the transmitters is transmitting (i.e., when $S = \emptyset$), as illustrated by the "idle time" designations depicted below the time axis for the third transmitter However, since the three transmitters are not saturated, each of the three transmitters counts down only a fraction of this time.

If the fraction of time that a transmitter i counts down is $\rho_i$, such that $0 \leq \rho_i \leq 1$, then, noting Eq. (2) and reducing $\pi_\emptyset$ by $\rho_i$ gives $$\rho_i \pi_\emptyset = \frac{\pi_i}{\theta_i}, \quad (8)$$

where $\pi_i / \theta_i = \pi_i (E[B_i]/E[T_i])$ is the fraction of time that transmitter i counts down via its back-off counter, and $\rho_i \pi_\emptyset$ reflects that transmitter i counts down via its back-off counter only a fraction of $\pi_\emptyset$. If a variable $\gamma_i$ is defined as:

$$\gamma_i = \rho_i \theta_i \quad (9)$$

for each transmitter i, a system of equations may be written as:

$$\pi_\emptyset = \frac{\pi_1}{\gamma_1} = \frac{\pi_2}{\gamma_2} = \ldots = \frac{\pi_n}{\gamma_n}, \quad (10)$$

which, along with the normalizing condition $\Sigma_S \pi_S = 1$, may be solved for the steady-state probabilities:

$$\pi_\emptyset = \frac{1}{1 + \gamma_1 + \gamma_2 + \ldots + \gamma_n} \quad (11)$$

-continued $$\pi_i = \frac{\gamma_i}{1 + \gamma_1 + \gamma_2 + \ldots + \gamma_n}.$$

The average throughput $x_i$ of a transmitter i is then $$x_i = \left(\frac{\gamma_i}{1 + \gamma_1 + \gamma_2 + \ldots + \gamma_n}\right) r_i p_i. \quad (12)$$

It is noted that, although it would be expected that the steady-state solution in Eq. (11) for unsaturated transmitters would be different than the solution in Eq. (3) for saturated transmitters, it has been determined that the solutions are remarkably similar. A difference between the solutions for saturated transmitters and unsaturated transmitters is that each component $\theta_i$ is replaced with $\gamma_i$. It also has been determined that Eq. (11) is the solution of another network with saturated transmitters. This may be seen from the following:

$$\gamma_i = \rho_i \theta_i = \rho_i \left(\frac{E[T_i]}{E[B_i]}\right) = \frac{E[T_i]}{E[B_i]/\rho_i}. \quad (13)$$

Thus, the solution in Eq. (11) is equivalent to a network in which each transmitter is saturated and has a larger average back-off time $E[B_i]/\rho_i$. An example is illustrated in FIG. 4, which depicts the dual saturated network for the unsaturated network of FIG. 3.

Figure 4:
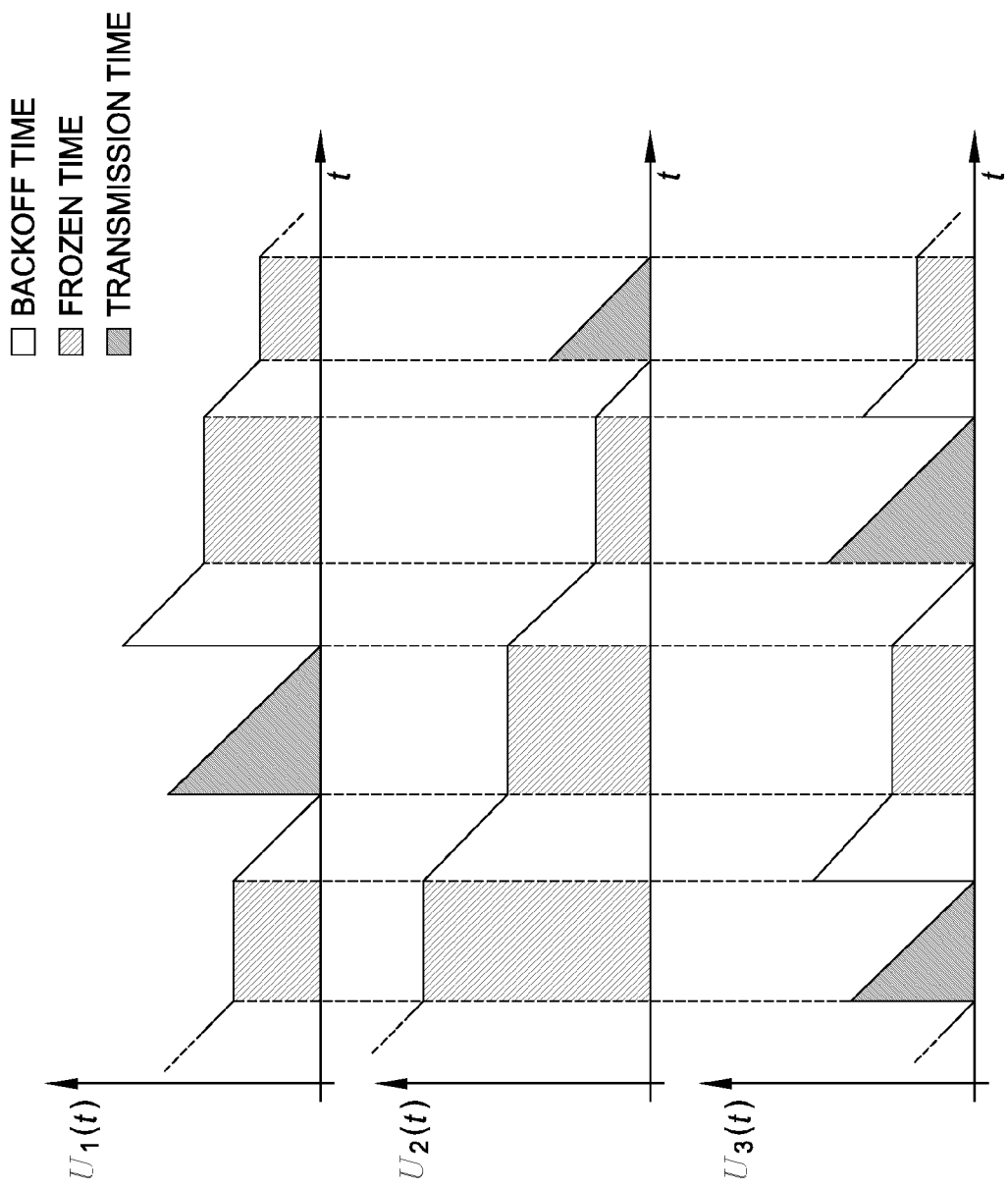
FIG. 4 depicts the dual saturated network for the unsaturated network of FIG. 3.

FIG. 4 depicts the dual saturated network for the unsaturated network of FIG. 3. As depicted in FIG. 4, the back-off intervals are stretched such that each transmitter i has no idle time. In both networks, the transmitters transmit during the same time and, thus, the steady-state solution must be the same. Given that the steady-state solution in Eq. (11) depends only on the average values, the probability distribution of the stretched back-off interval in the dual network, as depicted in FIG. 4, does not need to be determined. However, in order for the solution to be unique, the $\rho_i$ factors should be defined.

The $\rho_i$ factor is similar to the utilization factor in queuing theory and is directly related to stability. In order to see this, it is noted that each transmitter i is idle for a fraction $(1-\rho_i)\pi_\varnothing$ of time. If this idle time is positive, then the queue of transmitter i is expected to reach zero frequently. This implies that the empty queue is a positive recurrent state and, thus, that the queue is stable. Since $\pi_\varnothing > 0$ even for saturated transmitters, the condition for stability is $\rho_i < 1$. As a result, if the transmitter generates more traffic than the CSMA/CA MAC protocol can deliver, then $\rho_i$ tends to 1 and Eq. (11) falls back to the case of saturated transmitters as in Eq. (3). On the other hand, if the transmitter i generates too little traffic, then $\rho_i$ tends to 0 and the network behaves almost as if the transmitter i does not exist.

With the knowledge of the stability condition, the range of input rates under which the network is stable may be determined and, thus, the capacity region of the network may be characterized. Let $y_i = x_i/(r_i p_i)$ be the throughput $x_i$ of a transmitter i normalized with regard to the link capacity $r_i p_i$ of transmitter i. From Eq. (12), it may be determined that $y_i = \pi_i$ and, as a result, $\pi_\varnothing = 1 - \Sigma_j y_j$. Since $y_i = \pi_i = \pi_\varnothing (\rho_i \theta_i)$, the $\rho_i$ factor can be expressed as $$\rho_i = \left(\frac{1}{\theta_i}\right)\frac{y_i}{1 - \sum_j y_j}, \quad (14)$$

and, from the stability condition $\rho_i < 1$, an inequality $$y_i < \frac{\theta_i}{1 + \theta_i}\left(1 - \sum_{j \neq i} y_j\right) \quad (15)$$

can be derived for each transmitter i. The $1 - \Sigma_{j \neq i} y_j$ factor in Eq. (15) is the fraction of time that transmitter i is not frozen. In order to guarantee stability, within this time, transmitter i must transmit for strictly less time than the length of time for which the transmitter i would transmit in the saturated case.

As indicated by Eq. (15), the relation among the throughputs of the transmitters is linear and may be visualized.

In at least some embodiments, the capacity region of a set of transmitters may correspond to feasible conditions under which the transmitters may transmit. The capacity region of a set of transmitters may specify or indicate fractions of time for which the transmitters may transmit, input rates (or ranges of input rates) at which the transmitters may transmit, or the like. For example, the capacity region of a set of transmitters may indicate that the transmitter 1 transmits 40% of the time and transmitter 2 transmits 60% of the time, transmitters 1 and 2 each transmit 30% of the time and transmitter 3 transmits 40% of the time, or the like.

Figure 5:
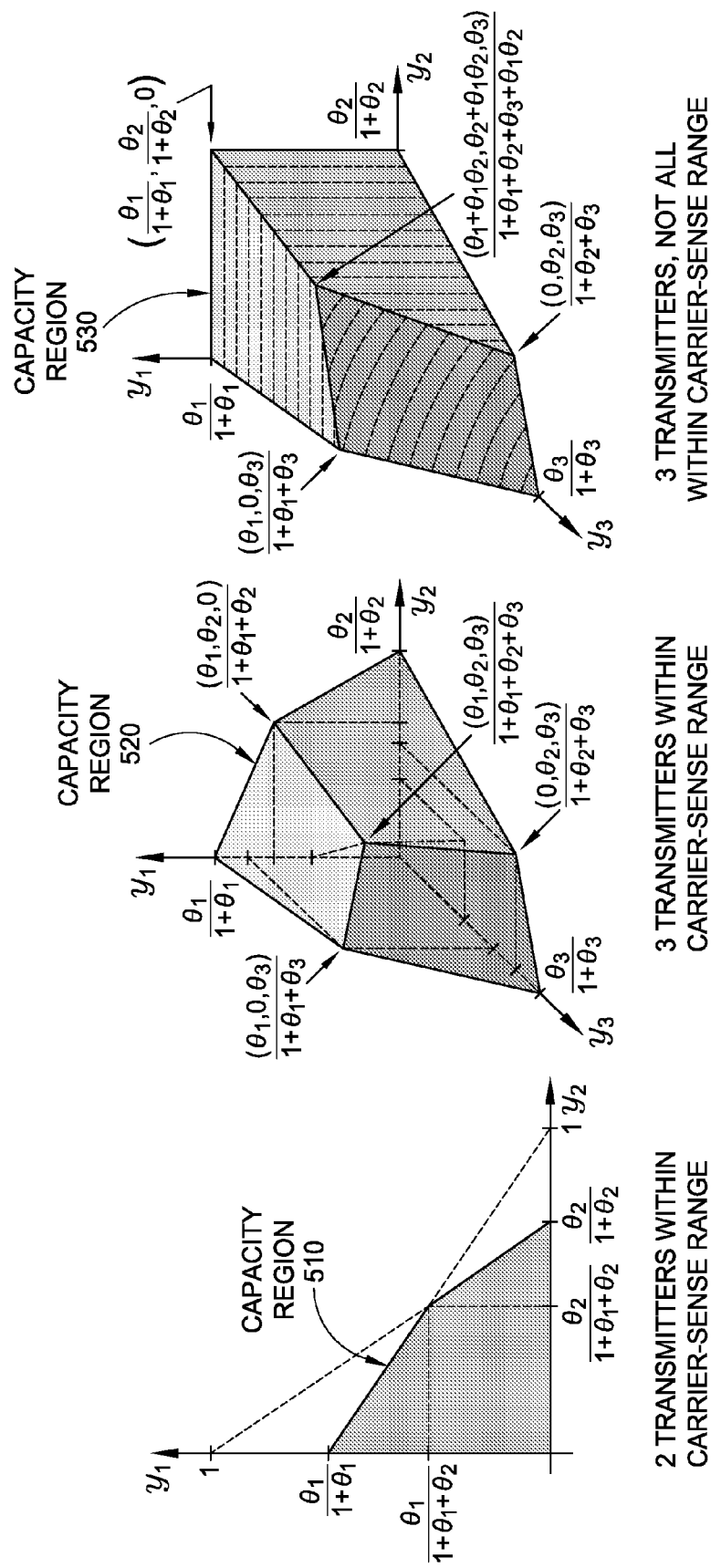
FIG. 5 depicts the capacity regions for three exemplary embodiments of networks including transmitters.

FIG. 5 depicts capacity regions for three exemplary embodiments of networks including transmitters.

The capacity regions 510, 520, and 530 of FIG. 5 represent feasible transmission conditions for the transmitters for which the capacity regions 510, 520, and 530 are determined. If the transmitters for which the capacity region is determined transmit according to a point $(y_1, y_2, \ldots, y_n)$ that falls within the capacity region (namely, within a shaded region of the graph), the transmissions are feasible and the transmission rates $(y_1 r_1 p_1, y_2 r_2 p_2, \ldots, y_n r_n p_n)$ of this point within the capacity region will be achieved. If the transmitters for which the capacity region is determined transmit according to a point $(y_1, y_2, \ldots, y_n)$ that falls outside the capacity region (namely, outside of a shaded region of the graph), the transmissions are not feasible and the transmission rates $(y_1 r_1 p_1, y_2 r_2 p_2, \ldots, y_n r_n p_n)$ of this point outside the capacity region will not be achieved. As discussed above, the transmission conditions for the transmitters may be represented as transmission rates for the transmitters, respectively. It will be appreciated that when transmission rates $(y_1 r_1 p_1, y_2 r_2 p_2, \ldots, y_n r_n p_n)$ for the transmitters are feasible then the corresponding transmission time fractions $(y_1, y_2, \ldots, y_n)$ for the transmitters may be used by the transmitters in order to achieve the transmission rates and, thus, that, in at least some embodiments, the transmission time fractions for the transmitters may be considered to be transmission conditions for the transmitters (e.g., a feasible set of transmission time fractions for the transmitters corresponds to a feasible set of transmission rates for the transmitters).

The capacity region 510 of FIG. 5 corresponds to an exemplary embodiment of a relatively simple network including only two transmitters within carrier-sense range. Each transmitter imposes a linear constraint for stability and the capacity region is the intersection of both areas. The upper boundary is defined by the set of input rates where at least one transmitter is saturated, and the intersection point is the case where both of the transmitters are saturated.

The capacity region 520 of FIG. 5 corresponds to an exemplary embodiment of a network including three transmitters within carrier-sense range. The linear constraint from each transmitter i now represents a plane, which crosses the axis $y_i$ at $\theta_i/(1+\theta_i)$ and the other axes $y_j$ at 1, for $j \neq i$. In general, when transmitters are within range, the capacity region is the intersection of the half-spaces defined by Eq. (15) and by $y_i \geq 0$ and, thus, is convex. For capacity region 520, similar to capacity region 510, the upper boundary is defined by the set of input rates where at least one transmitter is saturated. The line segments intersecting two planes result from the set of rates where at least two of the transmitters are saturated. The intersection point of the three planes is when all transmitters are saturated.

Under stability, it is also possible to derive an expression for the average inter-arrival time $E[A_i]$ between generated packets at a transmitter i. Recalling that $c_i(t)$ is the transmission count from transmitter i in a large time window [0,t), from the law of large numbers, it may be determined that the total transmission time of the transmitter approaches $c_i(t)E[T_i]$ as $t \to \infty$. Since the network is stable, the number of generated packets within this window is $p_i c_i(t)$ and, thus, $p_i c_i(t) E[A_i]$ approximates the total time t. The fraction of time $y_i$ that a transmitter i transmits is thus:

$$y_i = \left(\frac{1}{p_i}\right) \frac{E[T_i]}{E[A_i]}. \quad (16)$$

As a result, given the parameters $E[A_i]$, $E[T_i]$, $E[B_i]$, and $p_i$ of each transmitter i, a determination as to whether the network is stable may be made by determining if the condition of Eq. (15) holds for every transmitter i of the network. As depicted in the capacity region 520 of FIG. 5, setting $\rho_1=1$ corresponds to the plane on the top of the graph, setting $\rho_2=1$ corresponds to the plane on the right of the graph, and setting $\rho_3=1$ corresponds to the third plane (with darker shading) on the graph.

The capacity region 530 of FIG. 5 corresponds to an exemplary embodiment of a network including three transmitters where not all of the transmitters are within carrier-sense range.

In general, embodiments in which transmitters are within carrier-sense range (e.g., as depicted and described with respect to the capacity regions 510 and 520), may be generalized for an embodiment where the transmitters are not all within carrier-sense range. It is noted that the idea of stretching the back-off intervals to saturate the network, as depicted in FIG. 4, is general and also may be applied when the transmitters are not necessarily within carrier-sense range. In other words, the result of stretching the back-off interval of every transmitter i (e.g., such that the average back-off interval increases from $E[B_i]$ to $E[B_i]/\rho_i$, for some $0 < \rho_i \leq 1$) is a dual saturated network where transmitters transmit at exactly the same time. Since the solution for a saturated network is known from Eq. (7), the steady-state probabilities for an unsaturated network may be derived as:

$$\pi_\emptyset = \frac{1}{\sum_K \prod_{k \in K} \gamma_k} \quad (17)$$

$$\pi_S = \frac{\prod_{k \in S} \gamma_k}{\sum_K \prod_{k \in K} \gamma_k},$$

where $\gamma_k = \rho_k \theta_k$. The average throughput $x_i$ of a transmitter i may then be computed as $x_i = (\Sigma_{S:i \in S} \pi_S) r_i p_i$ by summing over all sets S where transmitter i is transmitting. The stability condition $\rho_i < 1$ is still the same when transmitters are not all within carrier-sense range. Let C(S) be the set of transmitters allowed to count down (e.g., neither transmitting nor frozen) when links in S are active. Each transmitter i is then idle for a fraction $(1-\rho_i)\Sigma_{S:i \in C(S)} \pi_S$ of time, which to be positive requires $\rho_i < 1$. The expression for the $\rho_i$ factors, however, is not the solution to a linear system as in Eq. (14). Rather, the $\rho_i$ factors are determined by solving a non-linear system of equations. Each transmitter provides a variable $\rho_i$ and an equation $y_i = \Sigma_{S:i \in S} \pi_S$ to the system, and it may be shown that this system has a unique solution, given that the system is stable. In at least some embodiments, however, either symbolical computation or numerical methods are used to find a unique solution to the system of equations $y_i = \Sigma_{S:i \in S} \pi_S$.

For the capacity region 530, it is assumed that a transmitter $\tau_3$ is within carrier-sense range of the other two transmitters $\tau_1$ and $\tau_2$, but that the other two transmitters $\tau_1$ and $\tau_2$ are not within carrier-sense range of each other. In this case, from Eq. (17) it may be determined that $$\pi_S = \frac{\prod_{i \in S} \rho_i \theta_i}{1 + \rho_1 \theta_1 + \rho_2 \theta_2 + \rho_3 \theta_3 + (\rho_1 \theta_1)(\rho_2 \theta_2)}, \quad (18)$$

from which a system of three equations may be specified as follows:

$y_1 = \pi_1 + \pi_{1,2}$ $y_2 = \pi_2 + \pi_{1,2}$ $y_3 = \pi_3. \quad (19)$

This system can be symbolically solved for $\rho_1$, $\rho_2$, and $\rho_3$ as:

$$\rho_1 = \left(\frac{1}{\theta_1}\right) \frac{y_1}{1 - y_1 - y_3} \quad (20)$$

$$\rho_2 = \left(\frac{1}{\theta_2}\right) \frac{y_2}{1 - y_2 - y_3}$$

$$\rho_3 = \left(\frac{1}{\theta_3}\right) \frac{y_3(1 - y_3)}{(1 - y_1 - y_3)(1 - y_2 - y_3)}.$$

Using the general result from Eq. (16), as well as the stability condition $\rho_i < 1$ for each equation in Eq. (20), a determination may be made as to whether the network is stable based on the parameters $E[A_i]$, $E[T_i]$, $E[B_i]$, and $p_i$ of each transmitter i. The capacity region for this exemplary embodiment is depicted as capacity region 530 of FIG. 5. As depicted in FIG. 5, setting) $\rho_1=1$ corresponds to the plane on the top of the graph, setting $\rho_2=1$ corresponds to the plane on the right of the graph, and setting $\rho_3=1$ corresponds to the third plane (with darker shading) on the graph. It will be appreciated that the capacity region 530 may be proven to be non-convex using a counterexample and, therefore, the convexity of the capacity region 530 does not necessarily hold when transmitters are not all within carrier-sense range.

It will be appreciated that the expressions of transmission time fractions $y_i$ associated with the capacity regions depicted in FIG. 5 are merely exemplary based on the exemplary sets of transmitters for the capacity regions depicted in FIG. 5. Accordingly, it will be appreciated that other expressions of transmission time fractions may be determined for other sets of transmitters (e.g., fewer or more transmitters, transmitters having different sets of interference constraints, or the like).

In at least some embodiments, the throughput of multi-hop flows in a CSMA/CA network may be determined. It will be appreciated that, in many types of wireless networks, each flow may need to traverse multiple hops in order to reach its intended destination. The embodiments depicted and described hereinabove for single-hop flows between neighboring transmitters may be generalized for multi-hop flows. As previously described, modeling of wireless multi-hop flows has traditionally been considered a difficult problem at least due to the strong interdependence between links (e.g., where the downstream links depend upon the upstream links for traffic and, thus, the queue state among the links is relatively tightly coupled). If multiple flows traverse the network, the problem of modeling of wireless multi-hop flows may become even more difficult, since transmissions of a given flow of the network affect the medium access of other flows of the network. As a result, the buffer dynamics typically are ignored at relay nodes and each link is assumed to be saturated with independent packet regeneration at each relay node. It is noted that the link coupling appears in the proposed equations and, thus, the exact behavior of the network may be modeled without approximations.

The derivation of the model of multi-hop flows in a CSMA/CA network is based on two observations. The first observation is that each transmitter in a given traffic flow may be considered to be a traffic source. Thus, based on the idea of stretching the back-off intervals of the transmitters (as depicted in FIG. 4), the result is a dual saturated network where nodes transmit at the same time. Thus, the analysis provided herein for saturated single-hop flows in a CSMA/CA network also may be applied for unsaturated multi-hop flows in a CSMA/CA network and, therefore, the steady-state probabilities are as defined in Eq. (17). Since the ratio $\theta_i$ of each transmitter i is given, a remaining question is how to determine the $\rho_i$ factor of each transmitter i. The second observation is that this can be addressed by assuming that the queues of all transmitters are stable (e.g., the traffic received by a node is eventually transmitted to its next hop, and no packets accumulate in the network queues).

From the stability assumption, a non-linear system of equations may be determined for use in determining the $\rho_i$ factors as follows. If $\tau_i^f$ is the i-th transmitter in the k-hop path used by flow $f$, then, in steady state, the following k−1 equations must hold:

$$\left(\sum_{S:\tau_1^f \in S} \pi_S\right) r_1^f p_1^f = \left(\sum_{S:\tau_2^f \in S} \pi_S\right) r_2^f p_2^f = \ldots = \left(\sum_{S:\tau_k^f \in S} \pi_S\right) r_k^f p_k^f, \quad (21)$$

where $r_i^f$ and $p_i^f$ are the bit rate and the delivery ratio of $\tau_i^f$, respectively. The physical interpretation of Eq. (21) is that the amount of information transmitted over each hop of a stable flow must be the same in steady state. Additionally, from Eq. (16), it may be determined that, at the transmitter $\tau_i^f$ of the source of flow $f$, the following holds:

$$y_1^f = \sum_{S:\tau_1^f \in S} \pi_S = \left(\frac{1}{p_1^f}\right) \frac{E[T_1^f]}{E[A_1^f]}. \quad (22)$$

From Eq. (21) and Eq. (22), there are k equations for each k-hop flow $f$ traversing the network. This system of equations can be solved for the unknown variables $\rho_i^f$. From this solution, a determination as to whether the network is stable may be made by determining whether the condition $0 \le \rho_i^f < 1$ holds for every transmitter $\tau_i^f$ of the network. If the condition $0 \le \rho_i^f < 1$ does not hold for every transmitter $\tau_i^f$ of the network or if the system does not converge, then the set of flow input rates is not feasible and, thus, the average inter-arrival time $E[A_1^f]$ at the transmitters may be increased until the stability condition is satisfied. Under stability, the throughput of each multi-hop flow $f$ may be computed as $x_f = (\Sigma_{S:r_1^f \in S} \pi_S) r_1^f p_1^f$.

The determination of the capacity region of multi-hop flows in a CSMA/CA network may be better understood by way of an example. For instance, consider a relatively simple four-hop chain topology with a single flow and assume that the first and the last hops in the chain topology are not within carrier-sense range. Since there is only one flow in this example, the $f$ notation is dropped in the following equations for convenience. From Eq. (17), the steady-state probability of a feasible set S of transmitters in this network may be expressed as:

$$\pi_S = \frac{\prod_{i \in S} \rho_i \theta_i}{1 + \rho_1 \theta_1 + \rho_2 \theta_2 + \rho_3 \theta_3 + \rho_4 \theta_4 + (\rho_1 \theta_1)(\rho_4 \theta_4)}. \quad (23)$$

Assuming stability, the amount of information transmitted by each hop of the flow is equal and, thus, $$(\pi_1 + \pi_{1,4}) r_1 p_1 = (\pi_2) r_2 p_2 = (\pi_3) r_3 p_3 = (\pi_4 + \pi_{1,4}) r_4 p_4. \quad (24)$$

For simplicity, it is assumed that the capacity $r_i p_i$ at each hop is the same. From Eq. (22), Eq. (23), and Eq. (24), a non-linear system of four equations may be constructed, and the non-linear system of four equations may be symbolically solved for the four variables $\rho_1$, $\rho_2$, $\rho_3$, and $\rho_4$, as $$\rho_1 = \left(\frac{1}{\theta_1}\right) \frac{y_1}{1 - 3y_1}$$

$$\rho_2 = \left(\frac{1}{\theta_2}\right) \frac{y_1(1 - 2y_1)}{(1 - 3y_1)^2}$$

$$\rho_3 = \left(\frac{1}{\theta_3}\right) \frac{y_1(1 - 2y_1)}{(1 - 3y_1)^2}$$

$$\rho_4 = \left(\frac{1}{\theta_4}\right) \frac{y_1}{1 - 3y_1}$$

(25)

where $y_1$ is the ratio between $E[T_1]$ and $p_1 E[A_1]$ as in Eq. (22). From the stability condition $0 \le \rho_i < 1$, the average inter-arrival time $E[A_1]$ may then be increased to determine the lower bound that will result in stabilization of the network.

In at least some embodiments, the problem of characterizing a multi-hop wireless network, including the capacity region of the multi-hop wireless network, through steady-state probabilities $\pi_S$ may be decomposed into two sub-problems including: (1) a first problem of finding the general form of the steady-state probabilities $\pi_S$, which may be achieved by a linear system of equations whose solution is described by Eq. (17); and (2) a second problem of finding the $\rho_i^f$ factors, which may be achieved by solving a non-linear system of equations described by Eq. (21) and Eq. (22). In general, the solution is exact and holds if $0 \leq \rho_i^f < 1$ for every transmitter of the network. It will be appreciated that the solution may be computed based only on the parameters: $E[A_i^f]$, $E[T_i^f]$, $E[B_i^f]$, $r_i^f$, $p_i^f$. Thus, the steady-state probabilities $\pi_S$ and the capacity region of a multi-hop wireless network are agnostic to the individual probability distributions of these parameters; rather, only the averages of these parameters are relevant.

It will be appreciated that, although embodiments of the capacity region characterization capability are primarily depicted and described herein within the context of an exemplary system model that is defined based on various assumptions, one or more of the assumptions used to define the exemplary system model may be modified while still supporting embodiments of the capacity region characterization capability. It is noted that, in at least some such modifications, the assumptions used to define the exemplary system model are discussed hereinabove in conjunction with the definition of the exemplary system model.

In at least some embodiments, a capacity region of a set of transmitters may be determined. Without loss of generality, let n be the number of transmitters in a set of transmitter for which the capacity region is to be determined. The n transmitters may or may not be within carrier sense range of each other, and each transmitter i may be either the source of a single-hop flow or a relay in a multi-hop flow. Regardless of its role, each transmitter i has associated therewith: (a) a parameter, $\theta_i = E[T_i]/E[B_i]$, representing the ratio of its expected transmission time $E[T_i]$ over its expected back-off interval time $E[B_i]$, and (b) a stability parameter $\rho_i$ representing its saturation level. The set of $\theta$ values for the n transmitters form a vector $$\vec{\theta} = (\theta_1, \theta_2, \ldots, \theta_n) \qquad (26)$$

and the set of stability parameters $\rho$ for the n transmitters form another vector $$\vec{\rho} = (\rho_1, \rho_2, \ldots, \rho_n). \qquad (27)$$

The interference constraints of the transmitters define the feasible sets where a group of transmitters may simultaneously transmit. Each feasible set S of transmitters is active for a fraction $\pi_S$ of time, expressed by $$\pi_S = \frac{\prod_{k \in S} \rho_k \theta_k}{\sum_K \prod_{k \in K} \rho_k \theta_k}. \qquad (28)$$

The sum of the $\pi$ values for all feasible sets sum to one, i.e., $\Sigma_S \pi_S = 1$. The set of the $\pi$ values form yet another vector $$\vec{\pi} = (\pi_\emptyset, \pi_{\{1\}}, \pi_{\{2\}}, \ldots, \pi_{\{n\}}, \ldots, \pi_{\{i,j\}}, \ldots, \pi_{\{j,k\}}, \ldots) \qquad (29)$$

which contains the fraction of time $\pi_S$ of each feasible set S. It will be appreciated that the vector $\vec{\pi}$ in Eq. (29) can be expressed as a function g of both vectors $\vec{\rho}$ and $\vec{\theta}$ as in $$\vec{\pi} = g(\vec{\rho}, \vec{\theta}), \qquad (30)$$

where each component $\pi_S$ of $\vec{\pi}$ is expressed as a function of $\vec{\rho}$ and $\vec{\theta}$ by Eq. (28). Each transmitter i transmits for a fraction $0 \leq y_i \leq 1$ of time (e.g., if transmitter i transmits for 50% of the time, then $y_i = 0.5$). Summing the fractions of time $\pi_S$ where transmitter i is active (i.e., all sets S such that $i \in S$), an expression for $y_i$ is obtained as $$y_i = \sum_{S: i \in S} \pi_S, \qquad (31)$$

and the set of the fractions of time that each transmitter is active form a vector $$\vec{y} = (y_1, y_2, \ldots, y_n). \qquad (32)$$

From Eq. (31), the vector $\vec{y}$ can be expressed as a function $f$ of $\vec{\pi}$ and, by consequence, as a function $f \cdot g$ of both $\vec{\theta}$ and $\vec{\rho}$, as $$\vec{y} = f(\vec{\pi}) = f(g(\vec{\rho}, \vec{\theta})) = f \cdot g(\vec{\rho}, \vec{\theta}) \qquad (33)$$

where $f \cdot g$ is the composite function of $f$ and g. Since $\vec{\theta}$ is usually fixed, the vector $\vec{y}$ can be expressed as a simpler function h of $\vec{\rho}$ as $$\vec{y} = h(\rho). \qquad (34)$$

From Eq. (34), the capacity region of the set of transmitters may be specified by first finding the inverse function $h^{-1}$ that express the stability parameters $\vec{\rho}$ as a function of the transmission time fractions $\vec{y}$ $$\vec{\rho} = h^{-1}(\vec{y}) \qquad (35)$$

providing a system of n equations (e.g., Eq. (14) where all transmitters are within carrier sense range of each other, Eq. (20) or another set of equations where not all transmitters are within carrier sense range of each other, and Eq. (25) or another set of equations where not all transmitters are within carrier sense range and multi-hop flows are present, or the like), and then limiting each stability parameter)°, in the system of equations in Eq. (35) to the range between zero (inclusive) and one (exclusive), i.e., $0 \leq \rho_i < 1$. The region determined by the equations $0 \leq \rho_i < 1$ is the capacity region, which is expressed in terms of $\vec{y}$ and $\vec{\theta}$ (e.g., Eq. (14), Eq. (20) and Eq. (25)). In summary, in at least some embodiments the capacity region of a given set of transmitters may be specified by:

1. Determining the expressions of the transmission time fractions $\vec{y} = (y_1, y_2, \ldots, y_n)$ of the transmitters as a function of the stability parameters $\vec{\rho} = (\rho_1, \rho_2, \ldots, \rho_n)$ of the transmitters and the $\vec{\theta} = (\theta_1, \theta_2, \ldots, \theta_n)$ values of the transmitters, as shown in Eq. (28) and Eq. (31), i.e. $\vec{y} = f(g(\vec{\rho}, \vec{\theta})) = f \cdot g(\vec{\rho}, \vec{\theta})$. It will be appreciated that, assuming that $\vec{\theta}$ is fixed, $\vec{y}$ can be expressed as a function of only $\vec{\rho}$, e.g., $\vec{y} = h(\vec{\rho})$.

2. Expressing the stability parameters $\vec{\rho}$ of the transmitters as a function of the transmission time fractions $\vec{y}$ of the transmitters, e.g., $\vec{\rho} = h^{-1}(\vec{y})$.

3. Limiting the stability parameter $\rho_i$ of each transmitter i in $\vec{\rho}$ to a range of values between zero (inclusive) and one (exclusive), i.e., $0 \leq \rho_i < 1$. The region determined by the equations $0 \leq \rho_i < 1$ is the capacity region of the given set of transmitters, and it is expressed as a function of $\vec{y}$ and $\vec{\theta}$ (e.g., Eq. (14), Eq. (20), and Eq. (25)).

The representation of the capacity region of a set of transmitters may also be specified as a region in an n-dimensional space, where the i-th axis represents either the range of the transmission time fraction $y_i$ of transmitter i (limited between 0 and 1) or a multiple of $y_i$, such as the flow input rate $x_i = y_i r_i p_i$ (bounded below at 0, but unbounded above). The n-dimensional capacity region is defined in terms of the $\vec{\theta} = (\theta_1, \theta_2, \ldots, \theta_n)$ values associated with the transmitters, and it may be determined by setting each of the stability parameters $\rho_i$ in the system of equations in Eq. (35) to a range of values between zero (inclusive) and one (exclusive), i.e., $0 \leq \rho_i < 1$. Exemplary representations of n-dimensional capacity regions for respective set of transmitters are depicted in FIG. 5.

Figure 6:
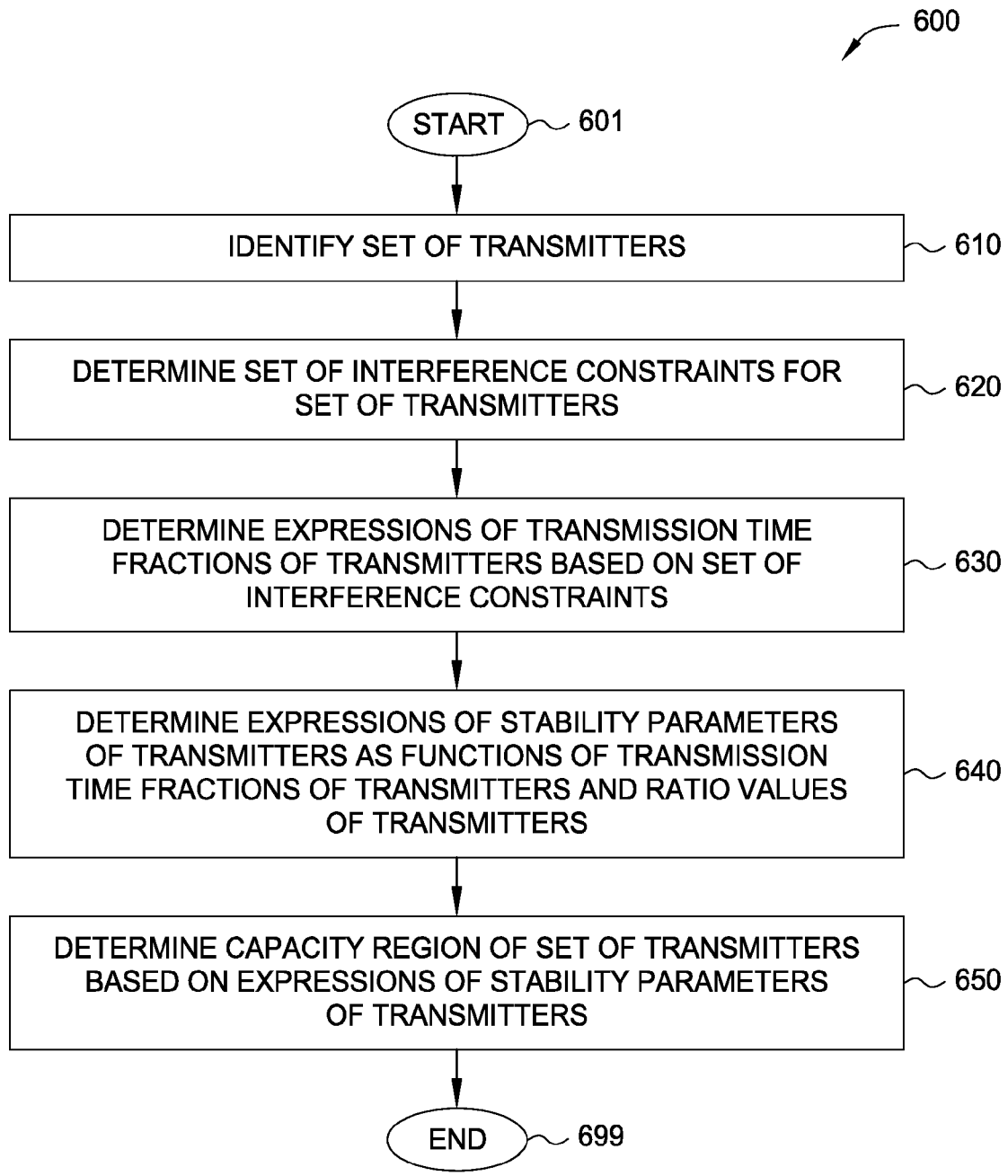
FIG. 6 depicts one embodiment of a method for determining the capacity region of a set of transmitters.

FIG. 6 depicts one embodiment of a method for determining the capacity region of a set of transmitters.

At step 601, method 600 begins.

At step 610, a set of transmitters is identified. The set of transmitters may include all of the transmitters of a network or a subset of the transmitters of a network.

At step 620, a set of interference constraints for the transmitters in the set of transmitters is determined. The interference constraints are indicative as to which transmitters are within interference range of each other such that transmissions by these transmitters would result in interference. The interference constraints may be retrieved from memory, determined based on wireless measurements, determined based on processing of interference constraint information, determined based on a wireless model, or the like, as well as various combinations thereof. The interference constraint information may include information which may be used to determine interference constraints between the transmitters in the set of transmitters. The interference constraint information may include geographic locations of the transmitters and signal strengths of the transmitters.

At step 630, expressions of transmission time fractions $\vec{y} = (y_1, y_2, \ldots, y_n)$ of the transmitters are determined based on the interference constraints for the transmitters. The transmission time fraction $y_i$ of each transmitter i is determined based on the interference constraints of the transmitters. The expressions of the transmission time fraction of each transmitter i may be expressed as a function of the stability parameters $\vec{\rho} = (\rho_1, \rho_2, \ldots, \rho_n)$ of the transmitters and the $\vec{\theta} = (\theta_1, \theta_2, \ldots, \theta_n)$ values of the transmitters as $$y_i = \sum_{S: i \in S} \frac{\prod_{k \in S} \rho_k \theta_k}{\sum_K \prod_{k \in K} \rho_k \theta_k}. \tag{36}$$

The expression of the transmission time fraction of each transmitter i may also be expressed as a function of the $\vec{\pi} = (\pi_\varnothing, \pi_{\{1\}}, \pi_{\{2\}}, \ldots, \pi_{\{n\}}, \ldots, \pi_{\{i, f\}}, \ldots, \pi_{\{j,k\}}, \ldots)$ values as $$y_i = \sum_{S: i \in S} \pi_S, \tag{37}$$

where the $\pi_S$ value for a given feasible set S may be indicative of a respective fraction of time that the transmitters within the feasible set S transmit. The $\pi_S$ values for each feasible set S are also expressed as a function of the stability parameters $\vec{\rho} = (\rho_1, \rho_2, \ldots, \rho_n)$ of the transmitters and the $\vec{\theta} = (\theta_1, \theta_2, \ldots, \theta_n)$ values of the transmitters as $$\pi_S = \frac{\prod_{k \in S} \rho_k \theta_k}{\sum_K \prod_{k \in K} \rho_k \theta_k}, \tag{38}$$

such that the expressions of transmission time fractions $\vec{y} = (y_1, y_2, \ldots, y_n)$ of the transmitters may also be expressed as functions of the stability parameters $\vec{\rho} = (\rho_1, \rho_2, \ldots, \rho_n)$ of the transmitters and the $\vec{\theta} = (\theta_1, \theta_2, \ldots, \theta_n)$ values of the transmitters, as discussed above. Assuming that $\vec{\theta}$ is fixed, the transmission time fractions $\vec{y}$ can be expressed as a simpler function of $\vec{\rho}$ as $\vec{y} = h(\vec{\rho})$. An exemplary embodiment of this is depicted and described herein with respect to Eq. (17), Eq. (18), and Eq. (19) associated with the exemplary capacity region expressed by Eq. (20) and depicted as capacity region 530 of FIG. 5. It will be appreciated that other expressions of transmission time fractions may be determined for other sets of transmitters (e.g., fewer or more transmitters, transmitters having different sets of interference constraints, or the like).

At step 640, expressions of the stability parameters $\vec{\rho} = (\rho_1, \rho_2, \ldots, \rho_n)$ of the transmitters are determined as functions of the transmission time fractions $\vec{y} = (y_1, y_2, \ldots, y_n)$ of the transmitters, i.e., $\vec{\rho} = h^{-1}(\vec{y})$. The expressions of the stability parameters $\vec{\rho}$ are determined by expressing $\vec{\rho}$ as a function $h^{-1}$ (n of the transmission time fractions $\vec{y}$ of the transmitters (as well as the $\vec{\theta}$ values of the transmitters, although $\vec{\theta}$ is assumed to be constant and, thus, may be omitted from the function $h^{-1}(\vec{y})$. An exemplary embodiment of this is depicted and described herein with respect to Eq. (20), which corresponds to the capacity region 530 of FIG. 5. It will be appreciated that other expressions of stability parameters may be determined for other sets of transmitters (e.g., fewer or more transmitters, transmitters having different sets of interference constraints, or the like).

At step 650, the capacity region of the set of transmitters is determined based on the expressions of the stability parameters $\vec{\rho}$ as functions of the transmission time fractions $\vec{y}$ of the transmitters and the $\vec{\theta}$ values of the transmitters. The capacity region of the set of transmitters may be determined by evaluating the expressions of the stability parameters for values of the stability parameters ranging between zero (inclusive) and one (exclusive), i.e., $0 \leq \rho_i < 1$.

At step 699, method 600 ends.

As described herein, the capacity region of a set of transmitters may be expressed using the expressions of the stability parameters of the transmitters and may be represented as a region in an n-dimensional space. The capacity region of the set of transmitters also provides an indication as to feasibility or stability of a given vector of transmission rates $\vec{x} = (x_1, x_2, \ldots, x_n) = (y_1 r_1 p_1, y_2 r_2 p_2, \ldots, y_n r_n p_n)$ or a given vector of transmission time fractions $\vec{y}=(y_1, y_2, \ldots, y_n)$. The vector of transmission time fractions $\vec{y}=(y_1, y_2, \ldots, y_n)$ is a normalized version of the input rate vector $\vec{x}=(x_1, x_2, \ldots, x_n)=(y_1 r_1 p_1, y_2 r_2 p_2, \ldots, y_n r_n p_n)$, where each component $y_i = x_i/(r_i p_i)$. If a determination is made that the given vector of transmission rates $\vec{x}$ or the given vector of transmission time fractions $\vec{y}$ fall within the capacity region of the set of transmitters, it provides an indication that the transmission conditions are stable or feasible (i.e., that the transmitters can transmit successfully at the desired rates). If a determination is made that the given vector of transmission rates $\vec{x}$ or the given vector of transmission time fractions $\vec{y}$ fall outside of the capacity region of the set of transmitters, it provides an indication that the transmission conditions are unstable or unfeasible (i.e., that the transmitters cannot transmit successfully at the desired rates). Thus, the capacity region of the set of transmitters may be used to determine the feasibility or stability of a given vector of transmission rates $\vec{x}$ or a given vector of transmission time fractions $\vec{y}$ which may be specified as part of, or determined from, the transmitter information associated with the transmitters in the set of transmitters. As described above, in at least some embodiments, transmission time fractions $\vec{y}=(y_1, y_2, \ldots, y_n)$ of the transmitters may be considered to be the normalized rates for the transmitters (e.g., a feasible vector of transmission time fractions $\vec{y}$ corresponds to a feasible vector of transmission rates $\vec{x}$ for the transmitters).

In at least some embodiments, in which all of the transmitters in the set of transmitters are sources of a single-hop flow, a determination may be made as to whether a vector of transmission time fractions $\vec{y}=(y_1, y_2, \ldots, y_n)$ of the transmitters is feasible. As explained in Eq. (16), another expression for the transmission time fraction $y_i$ of a transmitter i in the set of transmitters can be obtained as $$y_i = \left(\frac{1}{p_i}\right)\frac{E[T_i]}{E[A_i]}. \quad (39)$$

This expression is a function of the average packet inter-arrival time $E[A_i]$ of the source i (i.e., packets are generated by the source i and placed in the transmission queue of transmitter i every $E[A_i]$ seconds, on average), the average transmission time $E[T_i]$ of transmitter i (i.e., packets transmitted by transmitter i take $E[T_i]$ seconds to be transmitted, on average), and the delivery ratio of transmitter i (i.e., the fraction of successful transmissions made by transmitter i). The transmission time fractions $y_i$ for each transmitter i may be provided as an input, or may be computed based on a given expected per-packet transmission time $E[T_i]/p_i$ and a given expected inter-arrival time $E[A_i]$ provided as input for the set of transmitters. In either case, the transmission time fractions $\vec{y}$ for the set of transmitters are available for use in determining whether the vector of transmission time fractions $\vec{y}$ of the transmitters is feasible. Additionally, a vector of $\vec{\theta}=(\theta_1, \theta_2, \ldots, \theta_n)$ values is obtained for the transmitters, where the $\theta_i$ value for a transmitter i is equal to a ratio of the expected transmission time $E[T_i]$ of transmitter i to the expected back-off interval $E[B_i]$ of transmitter i. The $\vec{\theta}$ values for the set of transmitters may be provided as an input, or may be computed based on sets of expected transmission times and expected back-off intervals provided as input for the set of transmitters. In either case, values for the set of transmitters are available for use in determining whether the vector of transmission time fractions $\vec{y}$ for the transmitters is feasible. The stability parameter $\vec{\rho}_i$ of a transmitter i is computed based on the vector of transmission time fractions $\vec{y}$ and the $\vec{\theta}$ values of the transmitters. The stability parameter $\vec{\rho}_i$ for each transmitter i may be computed by finding the inverse function $h^{-1}$ such that $\vec{\rho}_i = h^{-1}(\vec{y})$, as explained before (e.g., based on Eq. (14) where all transmitters are within carrier sense range of each other, based on Eq. (20) or another set of equations where not all transmitters are within carrier sense range of each other, or the like). Thus, the determination as to whether a vector of transmission time fractions $\vec{y}=(y_1, y_2, \ldots, y_n)$ is feasible may be performed using vectors of transmitter input information associated with the transmitters, which may include the transmission time fractions $\vec{y}=(y_1, y_2, \ldots, y_n)$ and the $\vec{\theta}=(\theta_1, \theta_2, \ldots, \theta_n)$ values of the transmitters, input information indicative of the transmission time fractions $\vec{y}$ or the $\vec{\theta}$ values of the transmitters (e.g., values of the parameters $E[A_i]$, $E[T_i]$, $E[B_i]$, and $p_i$ of each transmitter i), or the like, as well as various combinations thereof. The vector of transmission time fractions $\vec{y}$ is determined to be feasible if each of the stability parameters $\rho_i$ in the vector $\vec{\rho}=(\rho_1, \rho_2, \ldots, \rho_n)$ is non-negative and strictly less than one. The vector of transmission time fractions $\vec{y}$ is determined not to be feasible if the stability parameters $\rho_i$ of any transmitter i is negative, equal to one, greater than one, or if the vector $\vec{\rho}=h^{-1}(\vec{y})$ cannot be found (e.g., the inverse function $h^{-1}$ does not exist). If the vector of transmission time fractions $\vec{y}$ is determined to be feasible, it provides an indication that the transmitters can support an associated vector $\vec{x}$ of input rates. If the set of transmission time fractions $\vec{y}$ is determined to be feasible, it provides an indication that the associated packet queues which queue packets for the transmitters will not continue to grow forever, and will frequently become empty.

In at least some embodiments, in which not all of the transmitters in the set of transmitters are within range of each other and multi-hop flows are present, a determination may be made as to whether a vector $\vec{y}=(y_1, y_2, \ldots, y_n)$ of transmission time fractions of the transmitters is feasible. For the multi-hop case, the fraction of time $y_i$ that a given relay transmitter i is actively transmitting is associated with the fraction of time $y_s$ that the flow source s transmits as $$y_i = y_s\left(\frac{r_s p_s}{r_i p_i}\right), \quad (40)$$

which is another expression for Eq. (21). This follows from the constraint that the information transmitted at each hop of the multi-hop flow must be the same. Further, the expected transmission time $E[T_i]$ of a relay transmitter i is also related to the expected transmission time $E[T_s]$ of the flow source s as $$E[T_i] = E[T_s]\left(\frac{r_s}{r_i}\right), \quad (41)$$

which follows from the constraint that the average packet size $E[P_i]$ of the relay transmitter i must be the same as the average packet size of the flow source $E[P_s]$ (i.e., $E[P_i]=E[T_i]\times r_i=E[T_s]\times r_s=E[P_s]$), since this is a multi-hop flow and each relay transmitter i transmits the packets generated by the flow source s. As shown in the case for single-hop flows, the equation.

$$y_s = \left(\frac{1}{p_s}\right)\frac{E[T_s]}{E[A_s]}. \quad (42)$$

holds for the flow source s and, using Eq. (40) and Eq. (41), the following equation holds for each relay transmitter i $$y_i = \left(\frac{1}{p_i}\right)\frac{E[T_i]}{E[A_s]}, \quad (43)$$

and thus the fraction of time that the relay transmitter i transmits depends on the packet inter-arrival time $E[A_s]$ at the flow source s. However, given the parameters of each flow source s, the determination as to whether a vector of transmission time fractions $\vec{y}=(y_1, y_2, \ldots, y_n)$ is feasible may be performed using an expression of the capacity region of the set of transmitters (which may vary for different sets of transmitters, e.g., different numbers of transmitters having different interference constraints associated therewith). An exemplary expression of the capacity region of a multi-hop flow with four transmitters is provided by Eq. (25). As described herein, an expression of the capacity region of a set of transmitters may express a vector of stability conditions $\vec{\rho}=(\rho_1, \rho_2, \ldots, \rho_n)$ in terms of transmission time fractions $\vec{y}=(y_1, y_2, \ldots, y_n)$ of the transmitters and the associated $\vec{\theta}=(\theta_1, \theta_2, \ldots, \theta_n)$ values of the transmitters. A vector of transmission time fractions j) is obtained (e.g., received as input, computed based on sets of expected transmission times and expected inter-arrival times provided as input for the set of transmitters, or the like) such that the vector of transmission time fractions $\vec{y}$ is available for use in determining whether the vector of transmission time fractions $\vec{y}$ is feasible. Additionally, a set of $\vec{\theta}=(\theta_1, \theta_2, \ldots, \theta_n)$ values is obtained for the transmitters (e.g., received as input, computed based on sets of expected transmission times and expected back-off intervals provided as input for the set of transmitters, or the like) such that the $\vec{\theta}$ values for the set of transmitters are available for use in determining whether the vector of transmission time fractions $\vec{y}$ is feasible. The stability parameters $\vec{\rho}=(\rho_1, \rho_2, \ldots, \rho_n)$ are computed based on the transmission time fractions $\vec{y}$ and the $\vec{\theta}$ values of the transmitters. The stability parameters $\vec{\rho}$ for the transmitters may be computed by applying the expression of the capacity region of the set of transmitters (e.g., a set of equations specifying the expressions for the stability parameters $\rho_i$ of each transmitter i). Thus, the determination as to whether a vector of transmission time fractions $\vec{y}=(y_1, y_2, \ldots, y_n)$ of the transmitters is feasible may be performed using vectors of transmitter input information associated with the transmitters, which may include the transmission time fractions $\vec{y}$ and the $\vec{\theta}$ values of the transmitters, input information indicative of the transmission time fractions $\vec{y}$ or the $\vec{\theta}$ values of the transmitters (e.g., values of the parameters $E[A_s]$, $E[T_s]$, $E[B_s]$, and $p_s$ of each flow source transmitters and the values of the parameters $E[T_i]$, $E[B_i]$, and $p_i$ of each relay transmitter i), or the like, as well as various combinations thereof. The vector of transmission time fractions $\vec{y}$ is determined to be feasible if the stability parameter $\vec{\rho}_i$ of each transmitter i is non-negative and strictly less than one. The vector of transmission time fractions $\vec{y}$ is determined not to be feasible if one or more of the stability parameters $\vec{\rho}_i$ of each transmitter i is negative, equal to one, greater than one, or if the vector $\vec{\rho}=h^{-1}(\vec{y})$ cannot be found (e.g., the inverse function $h^{-1}$ does not exist). If the vector of transmission time fractions $\vec{y}$ is determined to be feasible, it provides an indication that the transmitters can support an associated set of input rates. If the vector of transmission time fractions $\vec{y}$ is determined to be feasible, it provides an indication that the associated packet queues which queue packets for the transmitters will not continue to grow forever, and will frequently become empty.

Figure 7:
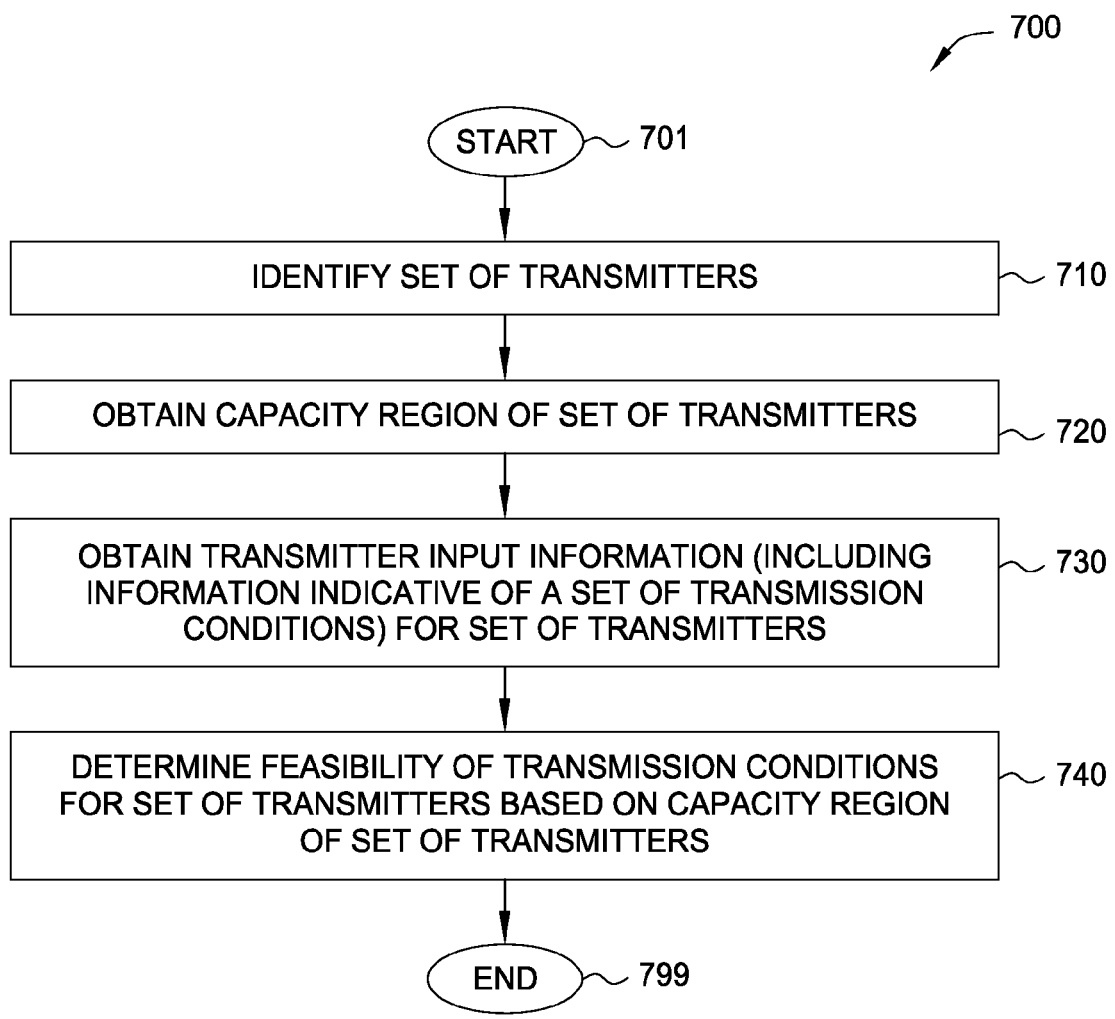
FIG. 7 depicts one embodiment of a method for determining feasibility of a given vector of transmission time fractions of a set of transmitters based on the capacity region of the set of transmitters.

FIG. 7 depicts one embodiment of a method for determining feasibility of a given vector of transmission time fractions of a set of transmitters based on the capacity region of the set of transmitters.

At step 701, method 700 begins.

At step 710, a set of transmitters is identified. The set of transmitters may include all transmitters of a network, a subset of transmitters of a network, or the like.

At step 720, a capacity region of the set of transmitters is obtained. The capacity region of the set of transmitters may be determined as depicted and described with respect to FIG. 6. The capacity region of the set of transmitters may be obtained from memory (e.g., where the capacity region of the set of transmitters was previously determined, such as through execution of method 600 of FIG. 6), obtained by determining the capacity region of the set of transmitters on-the-fly (e.g., by calling method 600 of FIG. 6 for execution as part of step 720 of method 700), or the like. As explained before, the capacity region of the set of transmitters may be defined based on expressions of the stability parameter vector $\vec{\rho}=(\rho_1, \rho_2, \ldots, \rho_n)$ of the transmitters (which may be obtained from a function $h^{-1}$ as $\vec{\rho}=h^{-1}(\vec{y})$ in terms of transmission time fractions $\vec{y}=(y_1, y_2, \ldots, y_n)$ and the $\vec{\theta}=(\theta_1, \theta_2, \ldots, \theta_n)$ values of the transmitters in the set of transmitters). The capacity region of the set of transmitters may be determined by evaluating the expressions of the stability parameters for values ranging between zero (inclusive) and one (exclusive), i.e., $0 \leq \rho_i < 1$.

At step 730, transmitter input information is obtained for the set of transmitters.

The transmitter input information includes information indicative of the transmission conditions for which feasibility is determined (e.g., includes vectors of values of the transmission conditions or information which may be used to compute the values of the transmission conditions). The transmission conditions for which feasibility is determined may include a transmission rate vector $\vec{x}'=(x'_1, x'_2, \ldots,$ $x'_n) = (y'_1 r_1 p_1, y'_2 r_2 p_2, \ldots, y'_n r_n p_n)$ of the transmitters, the corresponding transmission time fractions $\vec{y}' = (y'_1, y'_2, \ldots, y'_n)$ of the transmitters, or the like. The vector $\vec{y}'$ of transmission time fractions is a normalized version of the input rate vector $\vec{x}'$, where each component $y'_i = x'_i/(r_i p_i)$. The transmission conditions may be obtained directly or may be computed based on portions of the transmitter input information.

The transmitter input information may include a vector of transmission time fractions $\vec{y}' = (y'_1, y'_2, \ldots, y'_n)$ for which feasibility is to be determined and the $\vec{\theta}$ values of the transmitters, input information which may be used to compute the transmission time fractions $\vec{y}'$ or the $\vec{\theta}'$ values of the transmitters (e.g., values of the parameters $E[A_s]$, $E[T_s]$, $E[B_s]$, and $p_s$ of each flow source s and the values of the parameters $E[T_i]$, $E[B_i]$, and $p_i$ of each relay transmitter i), or the like, as well as various combinations thereof.

At step 740, a determination is made, based on the capacity region of the set of transmissions, as to whether the transmission conditions for the set of transmitters are feasible.

The determination as to whether transmission conditions for the set of transmitters are feasible includes checking if the stability parameter values are within the range between zero (inclusive) and one (exclusive), i.e., $0 \leq \rho_i < 1$. The feasibility may be verified for the transmitters by evaluating the expressions of the stability parameters (which define the capacity region for the set of transmitters) based on the transmitter input information. In a first example, when the transmitter input information includes the transmission time fractions $y_i$ and $\theta_i$ values of the transmitters, the transmission time fractions $y_i$ and the $\theta_i$ values of the transmitters may be plugged into the expressions of the stability parameters in order to verify if $y_i$ is feasible under the chosen $\theta_i$ values. In a second example, when the transmitter input information includes values of the parameters $E[A_i]$, $E[T_i]$, $E[B_i]$, and $p_i$ for each transmitter, the values of the parameters $E[A_i]$, $E[T_i]$, $E[B_i]$, and $p_i$ for the transmitters may be used to compute the transmission time fractions $y_i$ (e.g., as shown in Eq. (39) for single-hop flows and in Eq. (42) and Eq. (43) for multi-hop flows) and $\theta_i$ values (e.g., from the equation $\theta_i = E[T_i]/E[B_i]$) of the transmitters, which in turn may be plugged into the expressions of the stability parameters in order to compute the feasibility of $y_i$ under the chosen $\theta_i$ values. It will be appreciated that where the transmitter input information includes combinations of such information, the information may be used to evaluate the expressions of the stability parameters in order to compute the stability parameter values.

The transmission conditions for the set of transmitters are determined to be feasible if each of the stability parameter values $\vec{\rho} = (\rho_1, \rho_2, \ldots, \rho_n)$ for the transmitters is non-negative and strictly less than one. The transmission conditions for the set of transmitters are determined to be infeasible if one or more of the stability parameter values for the transmitters is negative, equal to one, greater than one, or if the vector $\vec{\rho} = h^{-1}(\vec{y})$ cannot be found (e.g., the inverse function $h^{-1}$ does not exist).

At step 799, method 700 ends.

It will be appreciated that, although depicted and described herein with respect to embodiments in which analytical expressions are used to represent capacity regions, parameters related to capacity regions, and the like, in at least some embodiments other types of expressions or representations may be used to represent capacity regions, parameters related to capacity regions, and the like. Thus, various references herein to analytical expressions also may be read as references to expressions or representations (e.g., a graphical representation of the capacity region, such as in the exemplary graphs depicted in FIG. 5).

It will be appreciated that, although primarily depicted and described herein with respect to embodiments in which the back-off intervals of the transmitters cannot be reduced, in at least some embodiments it may be possible to reduce the back-off intervals of the transmitters such that the stability condition for the capacity region becomes $\rho_i \geq 0$ (rather than $0 \leq \rho_i < 1$). The more general stability condition $\rho_i \geq 0$ may be better understood by considering the case of a steady-state solution $\pi$ where a given multiplier $\rho_i$ is larger than or equal to one, i.e., $\rho_i \geq 1$. If $E[B_i]$ is assumed fixed, then it is known that the steady-state solution 7 cannot be realized in practice with stable queues. However, if this assumption is relaxed, then a possible interpretation for this case is that the steady-state solution $\pi$ is feasible as long as the average back-off interval $E[B_i]$ is reduced by a factor of $1/\rho_i$. In this case, for $\rho_i > 1$, the actual interval $E[B_R]/\rho_i$ becomes shorter and, thus, is able to fully accommodate the desired steady-state probabilities. While this reduction ensures that the steady-state solution 7 is feasible, it does not, however, guarantee queue stability. In fact, a decrease of the average back-off interval $E[B_i]$ by only a factor of $1/\rho_i$ would still result in a saturated queue for transmitter i. Nonetheless, such a network could easily become stable if a shorter average back-off interval is selected. For example, if the shorter interval is chosen as $\rho'_i(E[B_i]/\rho_i)$ for any $0 \leq \rho'_i < 1$, then the same steady-state distribution $\pi$ is achieved and queue stability is also guaranteed. Therefore, any feasible wireless CSMA/CA multi-hop network has a dual which is stable as long as $\rho_i \geq 0$ for each transmitter i. The more general stability condition $\rho_i \geq 0$ only holds when the average back-off interval $E[B_i]$ of each transmitter i is allowed to be reduced. If reducing the average back-off intervals is not possible, then the more conservative stability condition $0 \leq \rho_i < 1$ must hold for each transmitter i.

It will be appreciated that various assumptions discussed herein may be modified or eliminated for various embodiments of the capacity region characterization capability.

It will be appreciated that references herein to transmitters also may be read as being references to sources, links, nodes, or any other suitable terms which may be applicable to various embodiments of the capacity region characterization capability.

In at least some embodiments, capacity region characterization and feasibility determination capabilities can be employed to understand the fundamental throughput limitations and predict throughput performance of certain types of communication networks (e.g., wireless CSMA/CA multi-hop networks or the like). In at least some embodiments of this work, one or more network capacity questions may be answered based on one or more models or embodiments adapted for use in understanding fundamental throughput limitations of a communication network. For example, in a network having a first traffic flow and a second traffic flow, the proposed capacity region characterization and feasibility test may be used to determine how much the second traffic flow may still achieve when the throughput of the first traffic flow increases by a certain amount. For example, in a network having one or more existing traffic flows, the proposed capacity region characterization and feasibility test may be used to determine the reduction(s) in rate(s) of the one or more existing traffic flows when a new traffic flow starts in the network. The proposed capacity region characterization and feasibility test are able to model the buffer dynamics of unsaturated transmitters while accounting for the interference constraints imposed by the transmission medium. The proposed capacity region characterization and feasibility test are able to model the buffer dynamics of unsaturated transmitters and handle multi-hop flows, while also accounting for the interference constraints imposed by the transmission medium. In at least some embodiments, the proposed capacity region characterization and feasibility test are provided for understanding fundamental throughput limitations and predicting throughput performance of certain types of communication networks without restrictions on node placement, such that the model is suitable for use with arbitrary topologies. In at least some embodiments, the proposed model is provided for characterizing the capacity region (e.g., the set of feasible input rates) of a wireless network (e.g., a wireless CSMA/CA network). In at least some embodiments, the proposed model configured to characterize the capacity region (e.g., the set of feasible input rates) of a wireless CSMA/CA network shows that the capacity region of the wireless CSMA/CA network is convex for the case where of the nodes are within carrier-sense range of each other, but non-convex in general. In at least some embodiments, the proposed model configured to characterize the capacity region (e.g., the set of feasible input rates) of a wireless CSMA/CA network shows that the capacity region is agnostic to the probability distributions of various (or perhaps even all) network parameters (e.g., transmission back-off times, transmission times, and inter-arrival times) and, thus, depend only on the expected values of the network parameters. In at least some embodiments, the proposed model configured to characterize the capacity region of a network may determine transmission conditions under which the network is stable and converges to a steady state. In at least some embodiments, the proposed model configured to characterize the capacity region of a network may use expressions to characterize the probabilities that a feasible set of transmitters is transmitting within the network.

Figure 8:
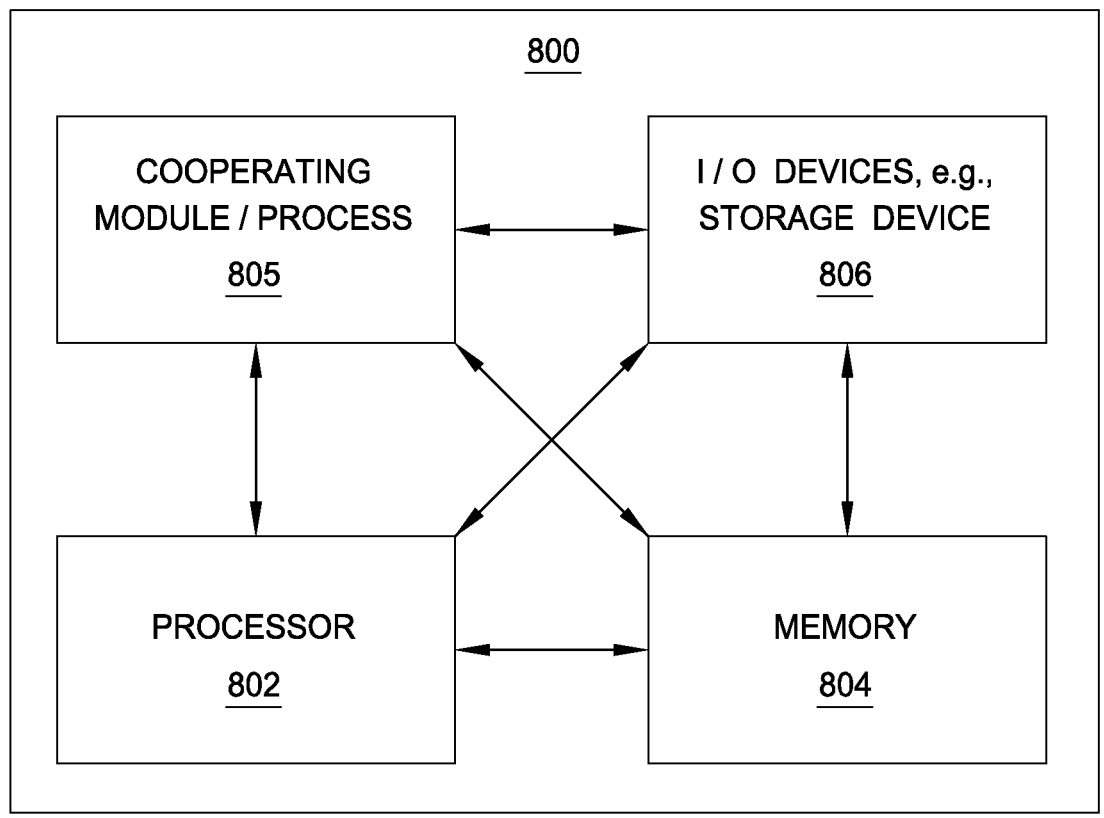
FIG. 8 depicts a high-level block diagram of a computer suitable for use in performing functions described herein.

FIG. 8 depicts a high-level block diagram of a computer suitable for use in performing functions described herein.

The computer 800 includes a processor 802 (e.g., a central processing unit (CPU) or other suitable processor(s)) and a memory 804 (e.g., random access memory (RAM), read only memory (ROM), and the like).

The computer 800 may also include a cooperating module/process 805. The cooperating process 805 can be loaded into memory 804 and executed by the processor 802 to implement functions as discussed herein and, thus, cooperating process 805 (including associated data structures) can be stored on a computer readable storage medium, e.g., RAM memory, magnetic or optical drive or diskette, and the like.

The computer 800 may also include one or more input/output devices 806. Examples of input/output devices include a user input device (e.g., a keyboard, a keypad, a mouse, and the like), a user output device (e.g., a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof.

It will be appreciated that computer 800 depicted in FIG. 8 provides a general architecture and functionality suitable for implementing functional elements described herein or portions of functional elements described herein. For example, the computer 800 provides a general architecture and functionality suitable for implementing one or more of a wireless node 112, a portion of a wireless node 112, capacity region characterization system 120, a portion of capacity region characterization system 120, or the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or," unless otherwise indicated (e.g., "or else" or "or in the alternative").

It will be appreciated that, while the foregoing is directed to various embodiments of features present herein, other and further embodiments may be devised without departing from the basic scope thereof.

What is claimed is:

1. An apparatus, comprising:
a processor and a memory communicatively connected to the processor, the processor configured to:
determine a set of interference constraints for a set of transmitters comprising a plurality of transmitters;
determine, based on the set of interference constraints, a plurality of expressions of a respective plurality of transmission time fractions of the transmitters as functions of a plurality of stability parameters of the respective transmitters and a plurality of ratio parameters of the respective transmitters, wherein the transmission time fractions of the transmitters are indicative of respective fractions of time that the transmitters transmit, wherein the ratio parameters of the transmitters comprise, for each of the transmitters, a respective ratio of an expected transmission time of the respective transmitter to an expected back-off time of the respective transmitter;
determine, based on the plurality of expressions of the respective plurality of transmission time fractions of the transmitters, a plurality of expressions of the respective plurality of stability parameters of the transmitters as functions of the transmission time fractions of the transmitters and the ratio parameters of the transmitters;
determine a representation of a capacity region of the set of transmitters based on the plurality of expressions of the respective plurality of stability parameters of the transmitters;
determine, based on the representation of the capacity region of the set of transmitters, transmission conditions to be used by the transmitters; and
propagate, toward the transmitters, the transmission conditions to be used by the transmitters.

2. The apparatus of claim 1, wherein the stability parameters of the transmitter are indicative of a respective plurality of saturation levels of the transmitters.

3. The apparatus of claim 1, wherein one of the transmitters is a source transmitter of a single-hop flow, wherein the processor is configured to:

compute the transmission time fraction for the source transmitter based on the expected transmission time of the source transmitter, an expected packet inter-arrival time of the source transmitter, and a packet delivery ratio of the source transmitter.

4. The apparatus of claim 1, wherein one of the transmitters is a relay transmitter for a multi-hop flow, wherein the processor is configured to:

compute the transmission time fraction for the relay transmitter based on the expected transmission time of the relay transmitter, an expected packet inter-arrival time of a source of the multi-hop flow for which the relay transmitter relays packets, and a packet delivery ratio of the relay transmitter.

5. The apparatus of claim 1, wherein the processor is configured to determine the expressions of the transmission time fractions of the transmitters by:

defining, based on the set of interference constraints of the transmitters, a plurality of feasible transmitter sets, wherein the feasible transmitter sets include respective groups of one or more of the transmitters which may transmit simultaneously without interference;

determining a plurality of expressions for a respective plurality of time fractions in which the respective feasible transmitter sets are active; and summing, for each of the transmitters in the set of transmitters, each of the time fractions for each of the feasible transmitter sets of which the respective transmitter in the set of transmitters is a member.

6. The apparatus of claim 1, wherein the plurality of transmitters includes n transmitters, wherein, to determine the representation of the capacity region of the set of transmitters, the processor is configured to:

determine the representation of the capacity region of the set of transmitters in the n-dimensional space.

7. The apparatus of claim 1, wherein the processor is configured to determine the representation of the capacity region of the set of transmitters by setting each of the stability parameters in the expressions for the stability parameters to a value between greater than or equal to zero and less than one.

8. The apparatus of claim 1, wherein the transmitters have a respective plurality of average back-off intervals associated therewith, wherein the average back-off intervals are allowed to be reduced, wherein the processor is configured to determine the representation of the capacity region of the set of transmitters by setting each of the stability parameters in the expressions for the stability parameters to a value equal to or greater than zero.

9. A method, comprising:

using a processor and a memory for:

determining a set of interference constraints for a set of transmitters comprising a plurality of transmitters;

determining, based on the set of interference constraints, a plurality of expressions of a respective plurality of transmission time fractions of the transmitters as functions of a plurality of stability parameters of the respective transmitters and a plurality of ratio parameters of the respective transmitters, wherein the transmission time fractions of the transmitters are indicative of respective fractions of time that the transmitters transmit, wherein the ratio parameters of the transmitters comprise, for each of the transmitters, a respective ratio of an expected transmission time of the respective transmitter to an expected back-off time of the respective transmitter;

determining, based on the plurality of expressions for the respective plurality of transmission time fractions, a plurality of expressions for the respective plurality of stability parameters of the transmitters as functions of the transmission time fractions of the transmitters and the ratio parameters of the transmitters;

determining a representation of a capacity region of the set of transmitters based on the plurality of expressions for the respective plurality of stability parameters of the transmitters;

determining, based on the representation of the capacity region of the set of transmitters, transmission conditions to be used by the transmitters; and propagating, toward the transmitters, the transmission conditions to be used by the transmitters.

* * * * *